US012596289B2

(12) United States Patent
Won

(10) Patent No.: US 12,596,289 B2
(45) Date of Patent: Apr. 7, 2026

(54) CAMERA DEVICE HAVING OPTICAL IMAGE STABILIZER FUNCTION

(71) Applicant: LG INNOTEK CO., LTD., Seoul (KR)

(72) Inventor: Chang Hee Won, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 328 days.

(21) Appl. No.: 18/266,512

(22) PCT Filed: Dec. 9, 2021

(86) PCT No.: PCT/KR2021/018689
§ 371 (c)(1),
(2) Date: Jun. 9, 2023

(87) PCT Pub. No.: WO2022/124837
PCT Pub. Date: Jun. 16, 2022

(65) Prior Publication Data
US 2024/0027874 A1     Jan. 25, 2024

(30) Foreign Application Priority Data

Dec. 9, 2020    (KR) ........................ 10-2020-0171203
Dec. 24, 2020    (KR) ........................ 10-2020-0182860

(51) Int. Cl.
*G03B 3/10*        (2021.01)
*G03B 5/00*        (2021.01)
*G03B 17/12*       (2021.01)

(52) U.S. Cl.
CPC ................. *G03B 3/10* (2013.01); *G03B 5/00* (2013.01); *G03B 17/12* (2013.01); *G03B 2217/007* (2013.01)

(58) Field of Classification Search
CPC ............................ H04N 23/54; H04N 23/687
See application file for complete search history.

(56) References Cited

U.S. PATENT DOCUMENTS

| 11,627,253 B2 | 4/2023 | Jeong |
| 12,132,062 B2 | 10/2024 | Baik et al. |
| (Continued) | | |

FOREIGN PATENT DOCUMENTS

| JP | 2013-101279 | * | 5/2013 | ............... G03B 5/00 |
| KR | 1999-0016469 U | | 5/1999 | |
| (Continued) | | | | |

*Primary Examiner* — Lauren Nguyen
(74) *Attorney, Agent, or Firm* — Birch, Stewart, Kolasch & Birch, LLP

(57) ABSTRACT

A camera device according to an embodiment includes an image sensor including a plurality of connection pins; and a substrate having an open region formed in a region where the image sensor is disposed and including terminals connected to the plurality of connection pins of the image sensor; wherein a number of the plurality of connection pins of the image sensor is greater than a number of the terminals of the substrate, wherein one surface of the substrate includes: a first region and a second region facing each other in a first direction with the open region therebetween; and a third region and a fourth region facing each other in a second direction different from the first direction with the open region therebetween; and wherein a number of terminals disposed in each of the first to fourth regions is the same.

15 Claims, 17 Drawing Sheets

(56)                    References Cited

U.S. PATENT DOCUMENTS

| | | | |
|---|---|---|---|
| 2011/0097061 | A1 | 4/2011 | Lee et al. |
| 2016/0139357 | A1* | 5/2016 | Yamakawa .............. G02B 7/08 |
| | | | 348/374 |
| 2016/0142605 | A1 | 5/2016 | Shimizu et al. |
| 2022/0190015 | A1 | 6/2022 | Baik et al. |

FOREIGN PATENT DOCUMENTS

| | | | | |
|---|---|---|---|---|
| KR | 10-2010-0028886 | A | 3/2010 | |
| KR | 10-2011-0045343 | A | 5/2011 | |
| KR | 10-2015-0057786 | A | 5/2015 | |
| KR | 10-2015-0118310 | A | 10/2015 | |
| KR | 10-2017-0021682 | A | 2/2017 | |
| KR | 10-2020-0039378 | A | 4/2020 | |
| KR | 10-2020-0051556 | A | 5/2020 | |
| KR | 10-2020-0058815 | A | 5/2020 | |
| KR | 10-2020-0086035 | A | 7/2020 | |
| KR | 10-2020-0106312 | A | 9/2020 | |
| KR | 10-2020-0114251 | A | 10/2020 | |
| WO | WO 2015/016002 | A1 | 2/2015 | |
| WO | WO2020/180078 | A1 | 9/2020 | |
| WO | WO-2020-180078 | * | 10/2020 | ............. H01F 7/126 |

* cited by examiner

[FIG. 1]
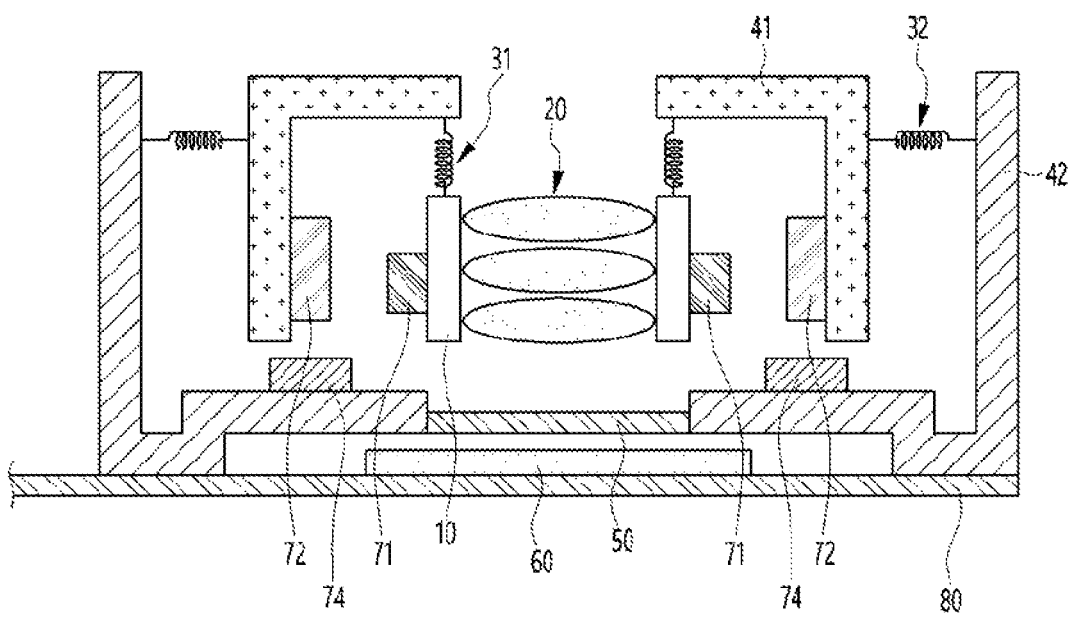
[FIG. 2]
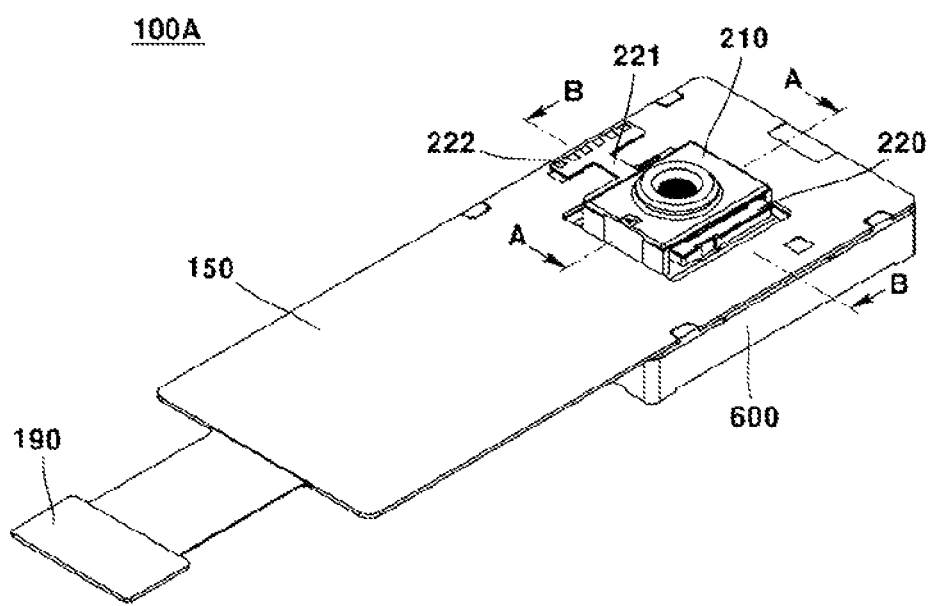

[FIG. 3]
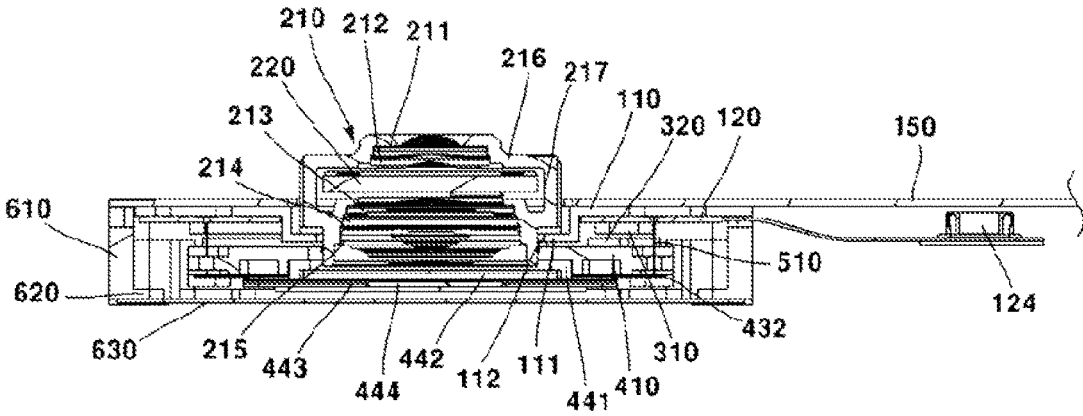
[FIG. 4]
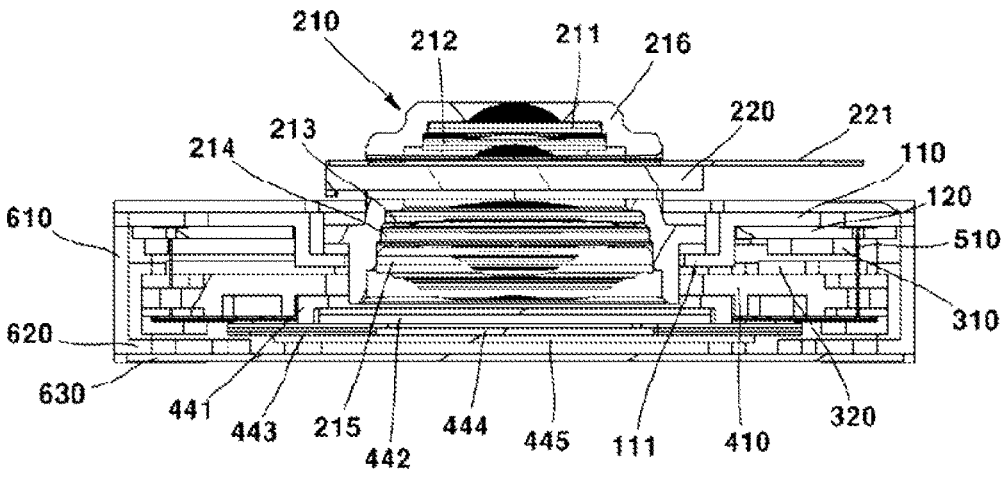

[FIG. 5]
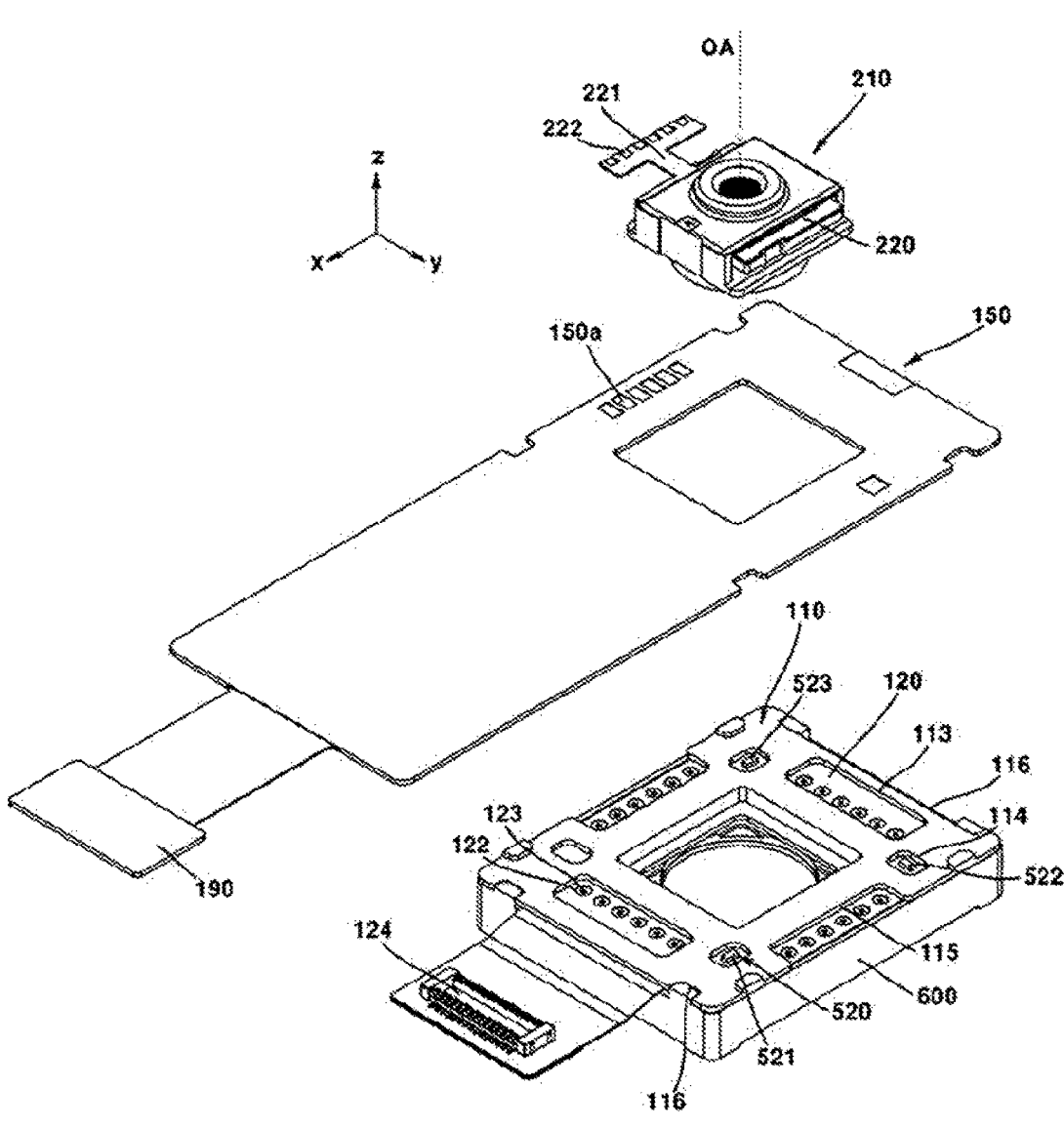

[FIG. 6]
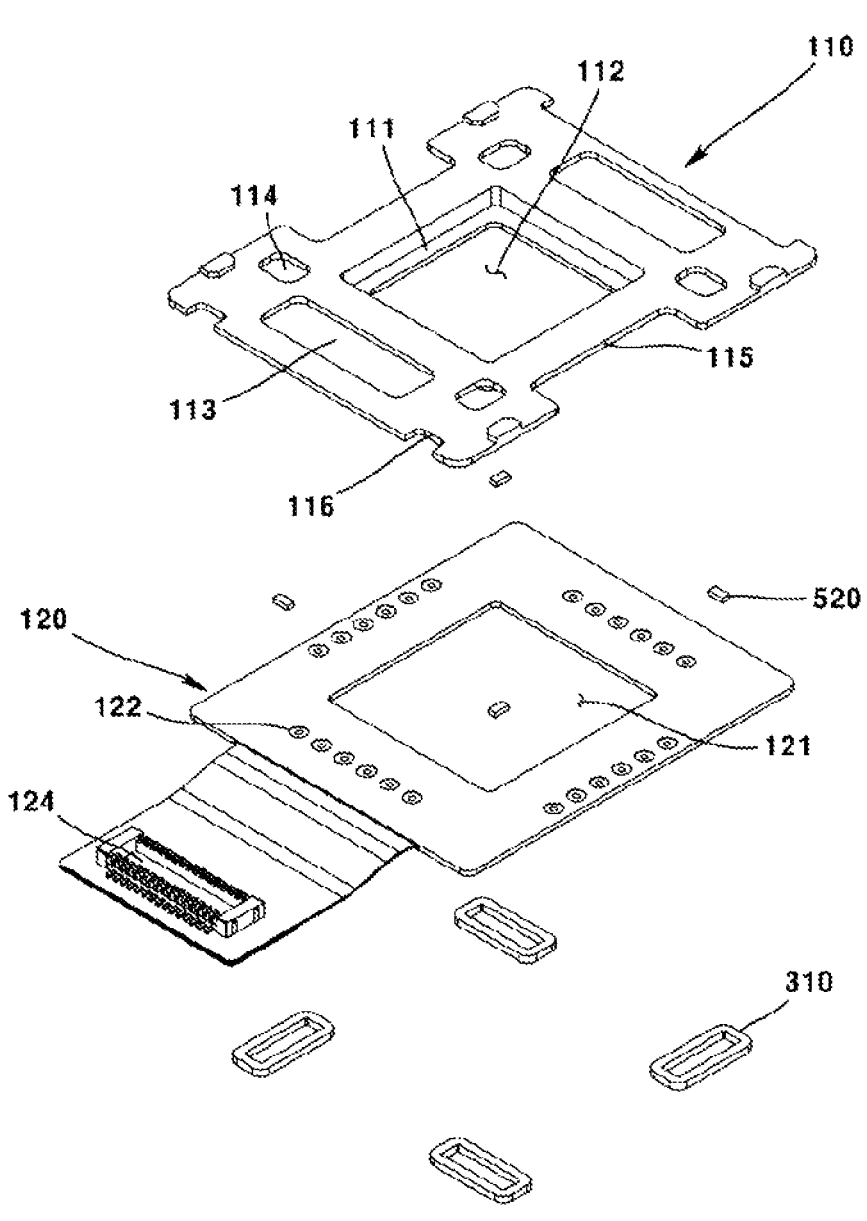

【FIG. 7】
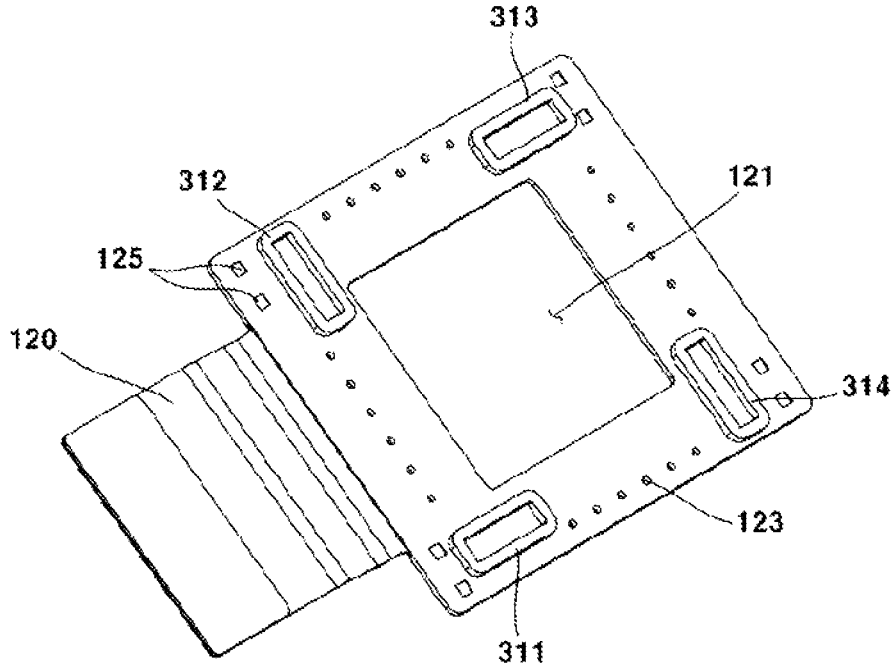
【FIG. 8】
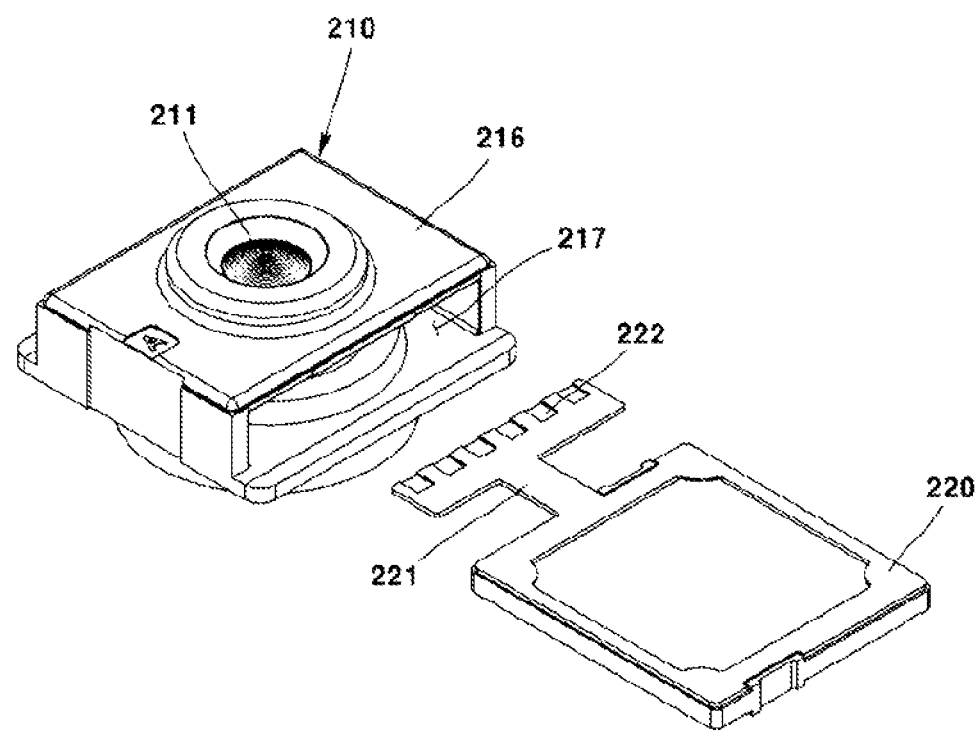

[FIG. 9a]
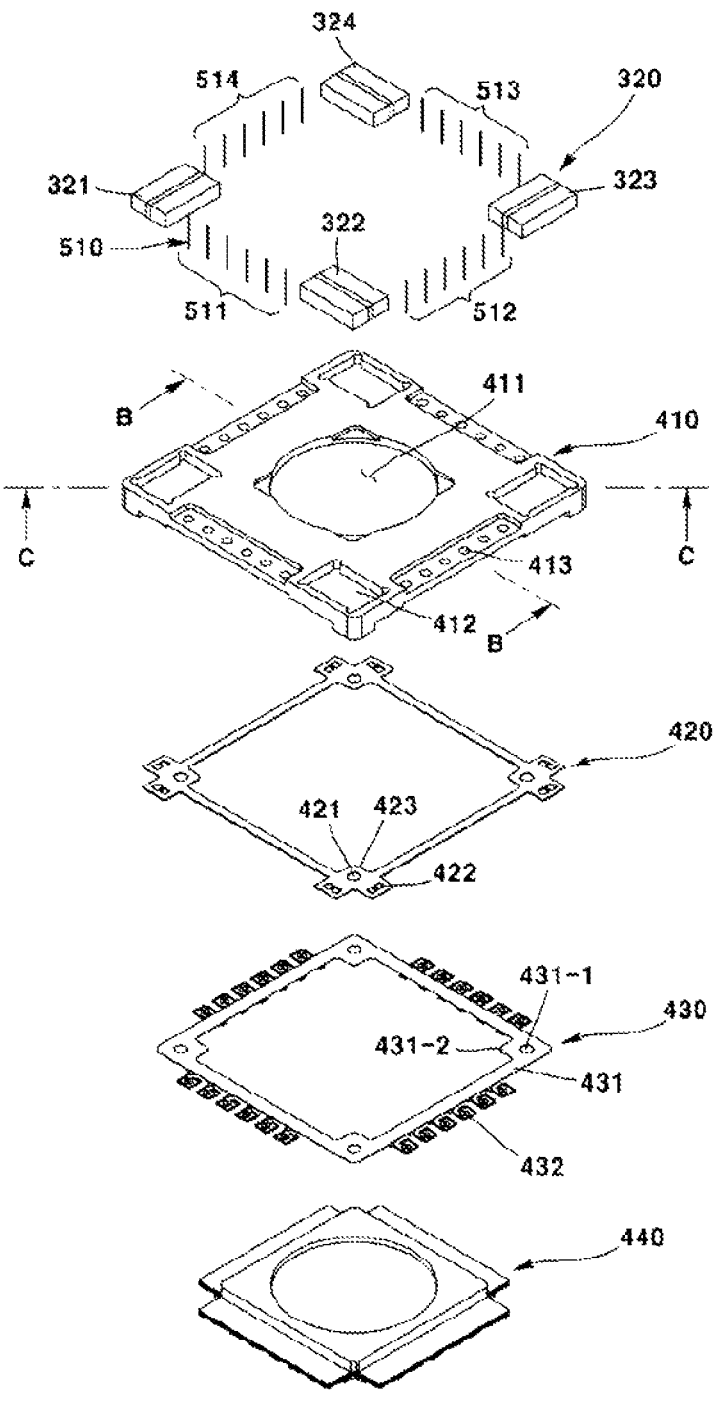

[FIG. 9b]
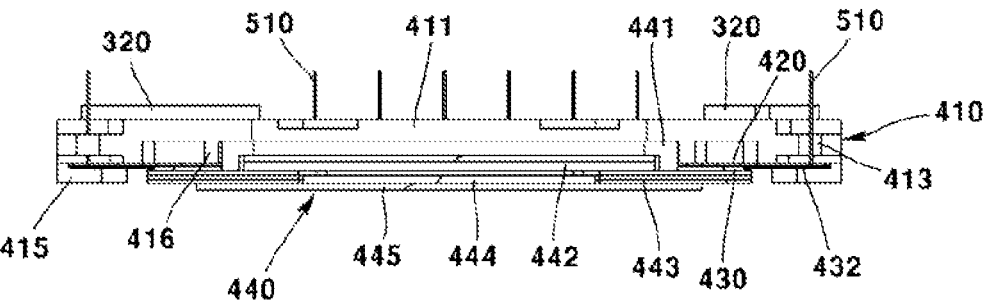
[FIG. 9c]
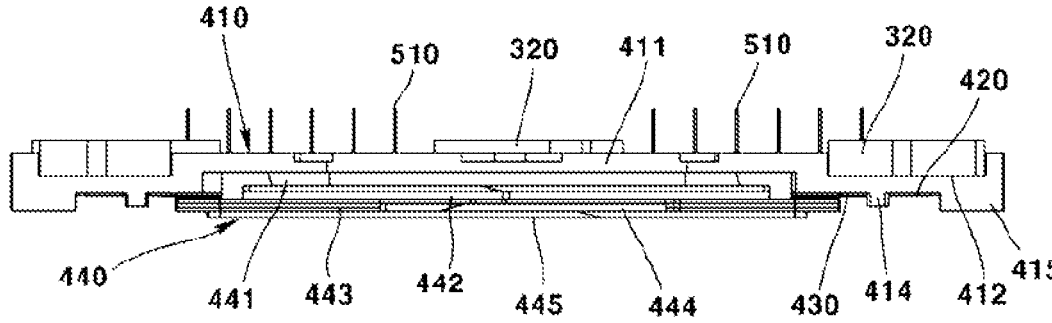

[FIG. 10]
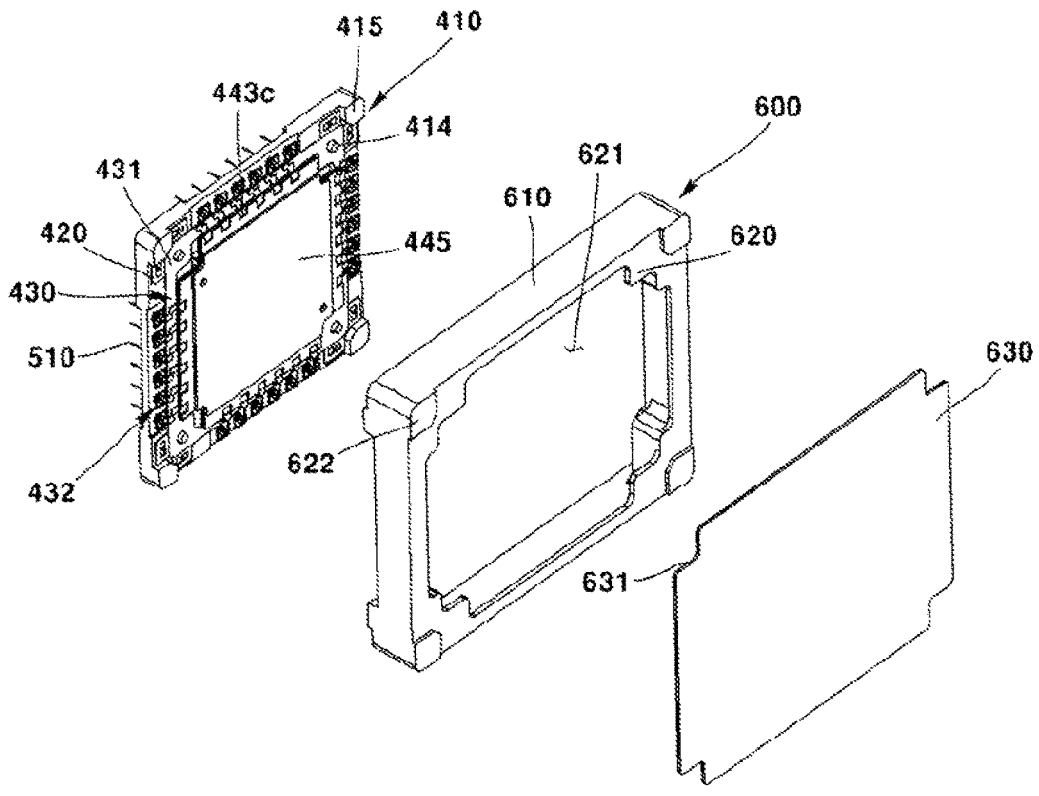
[FIG. 11a]
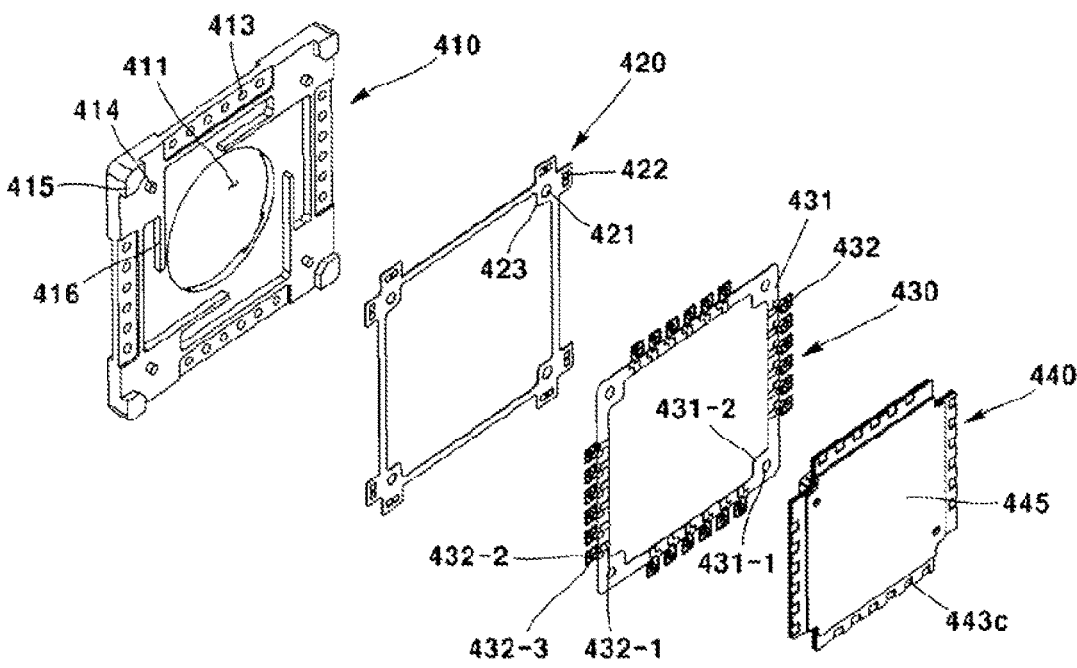

【FIG. 11b】
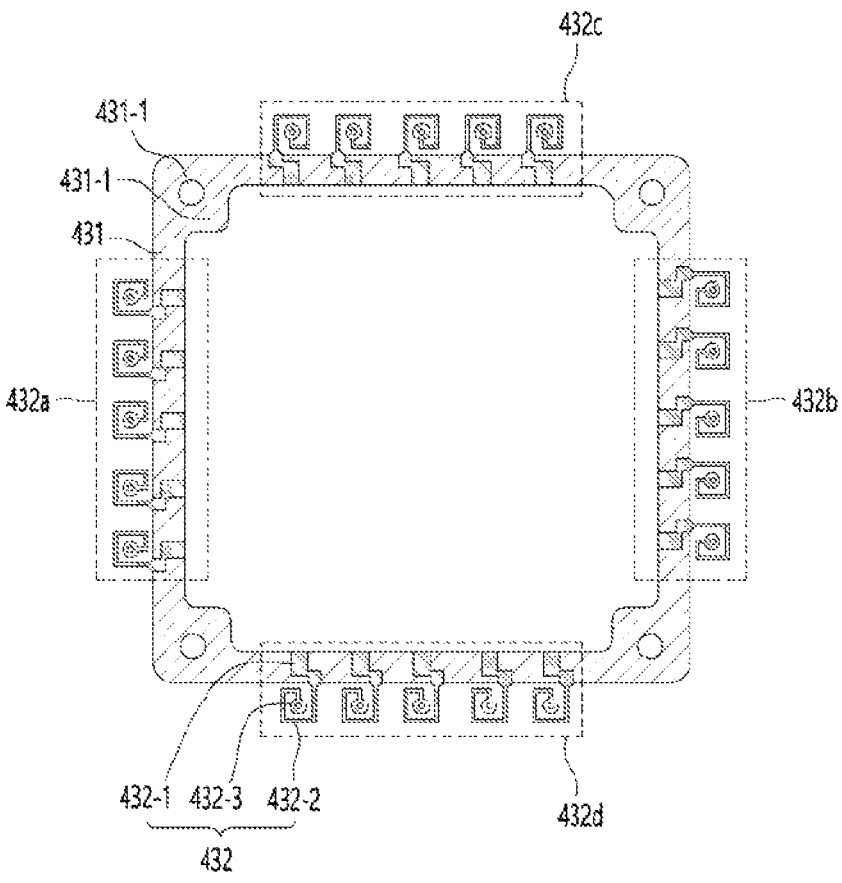
【FIG. 11c】
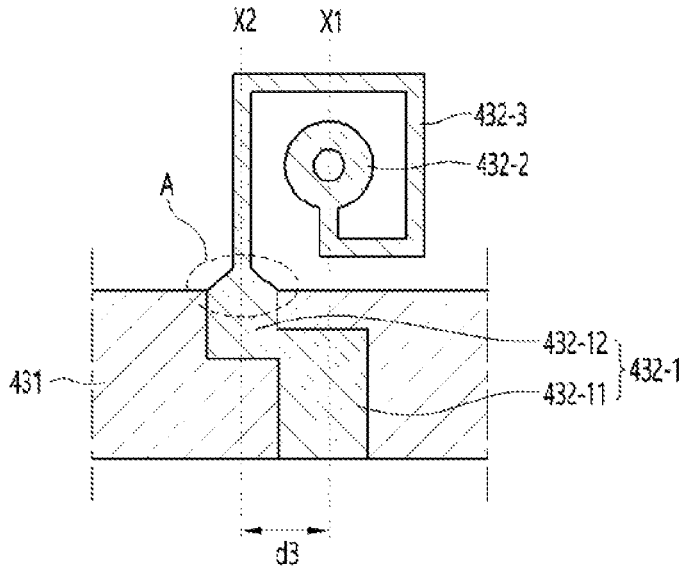

[FIG. 12]
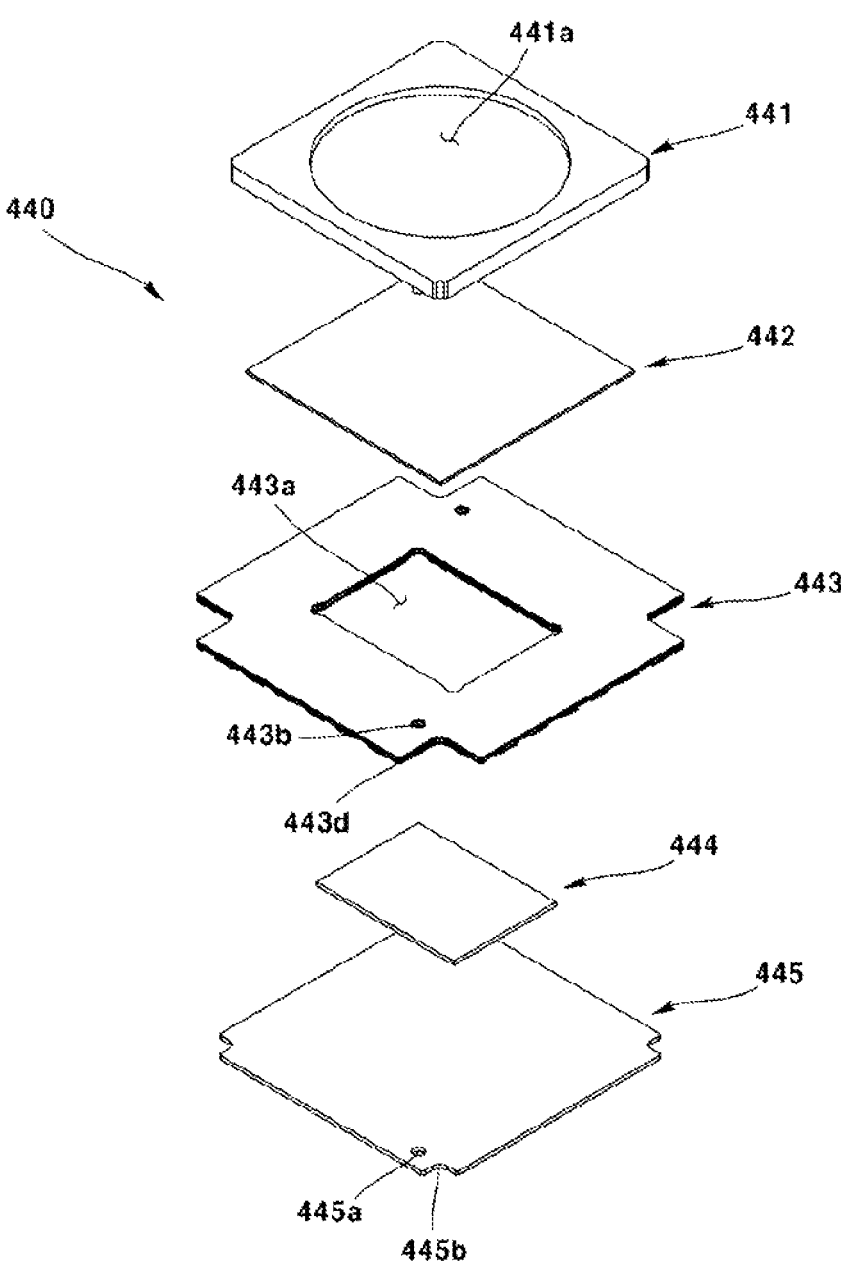

[FIG. 13]
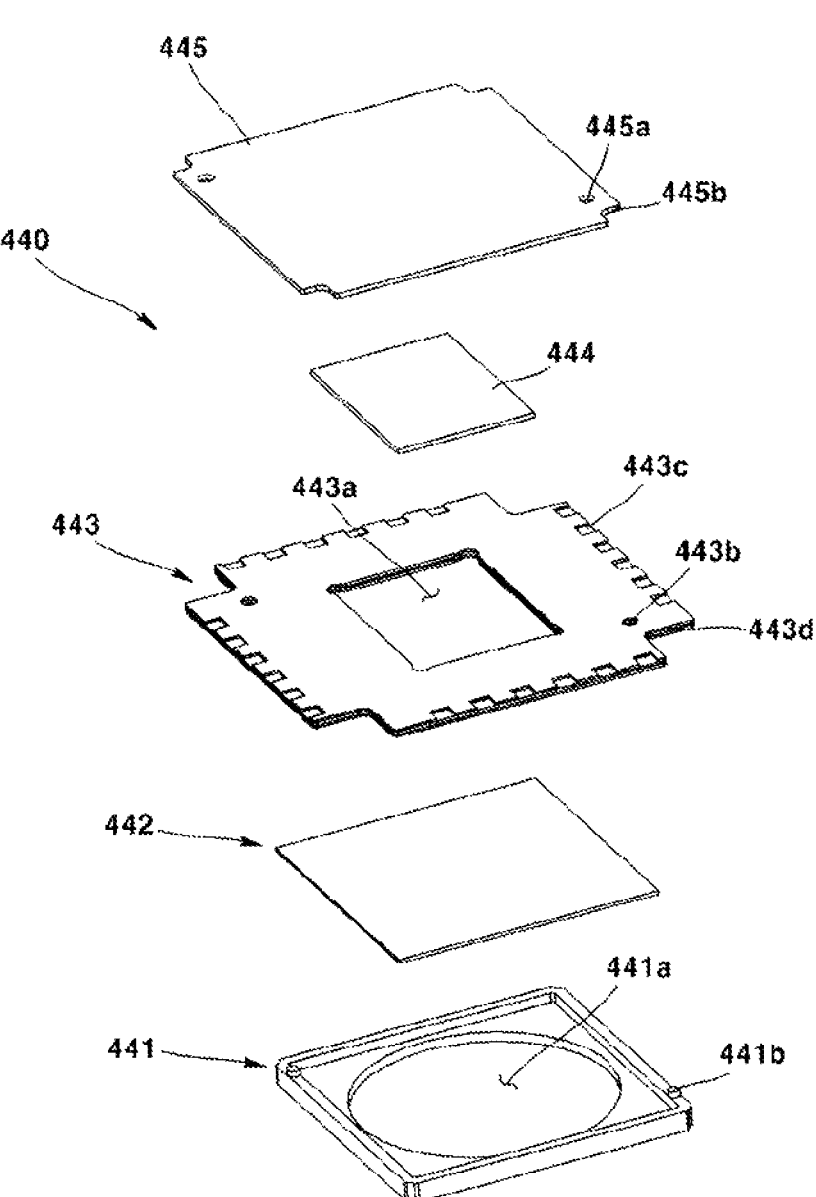

[FIG. 14]
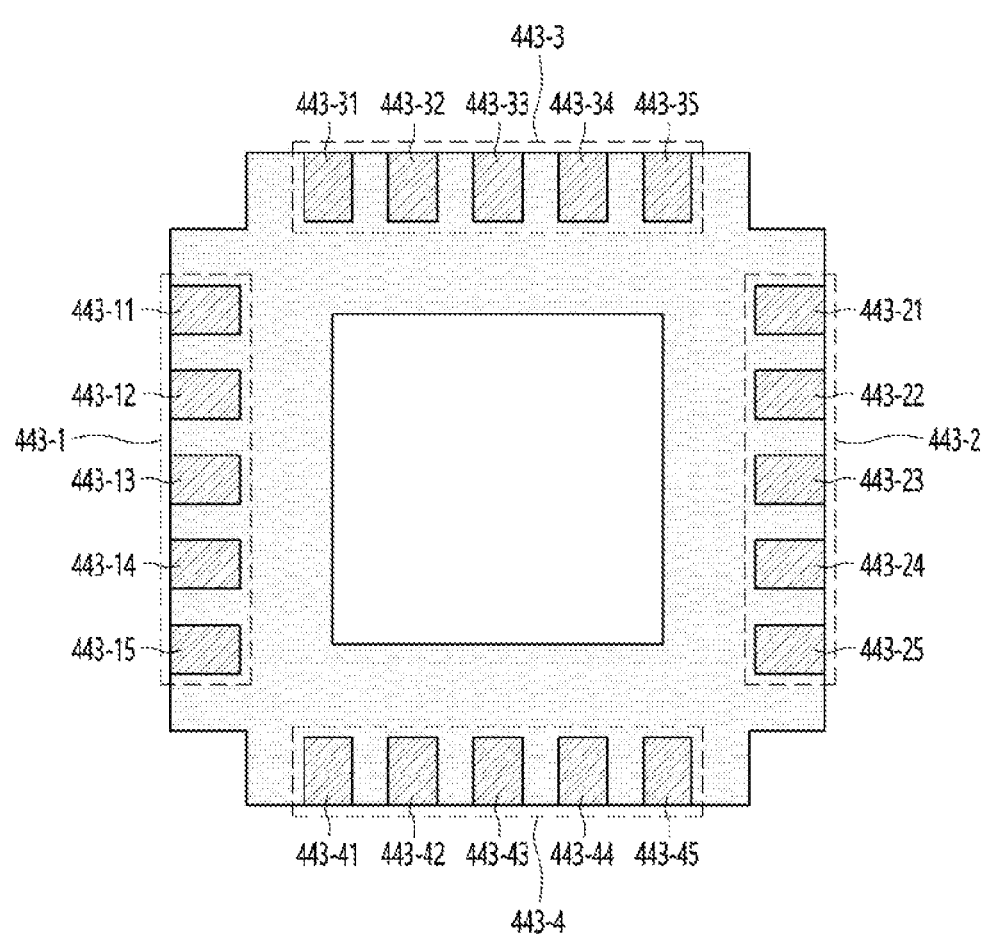

[FIG. 15]
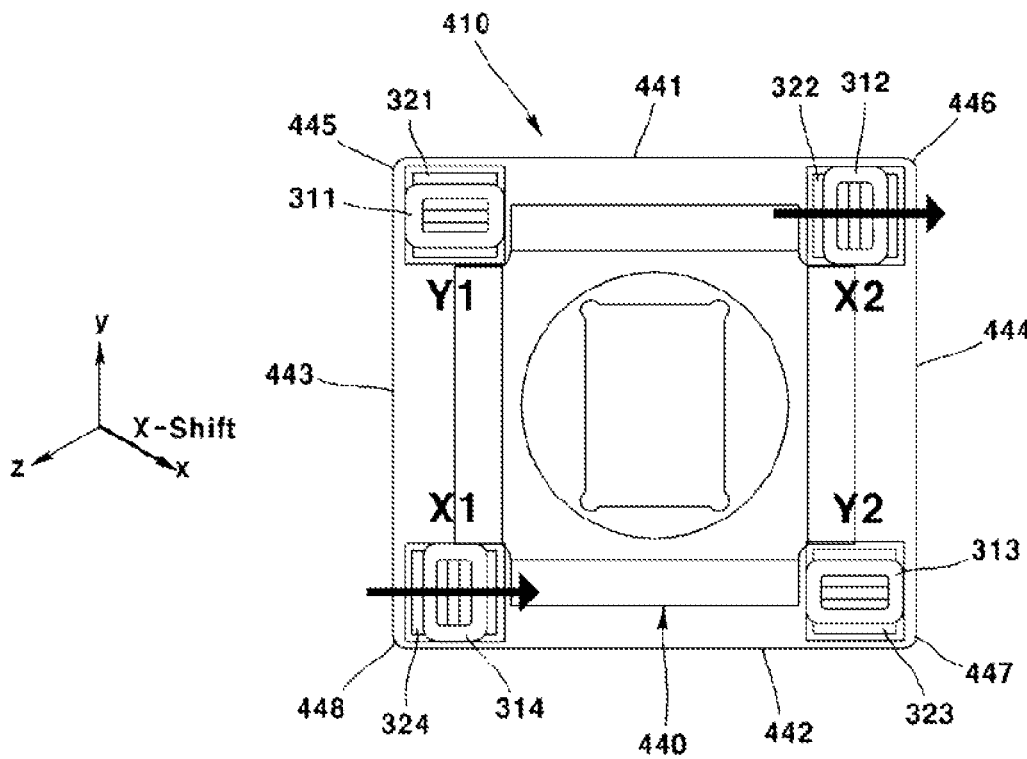
[FIG. 16]
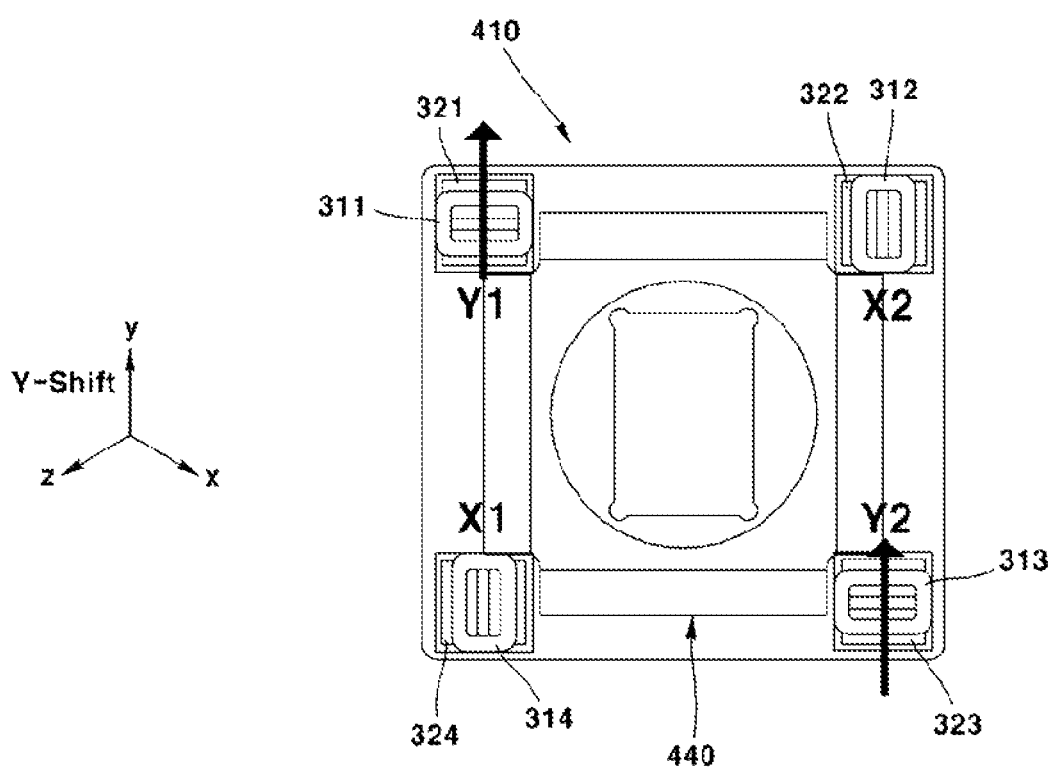

[FIG. 17]
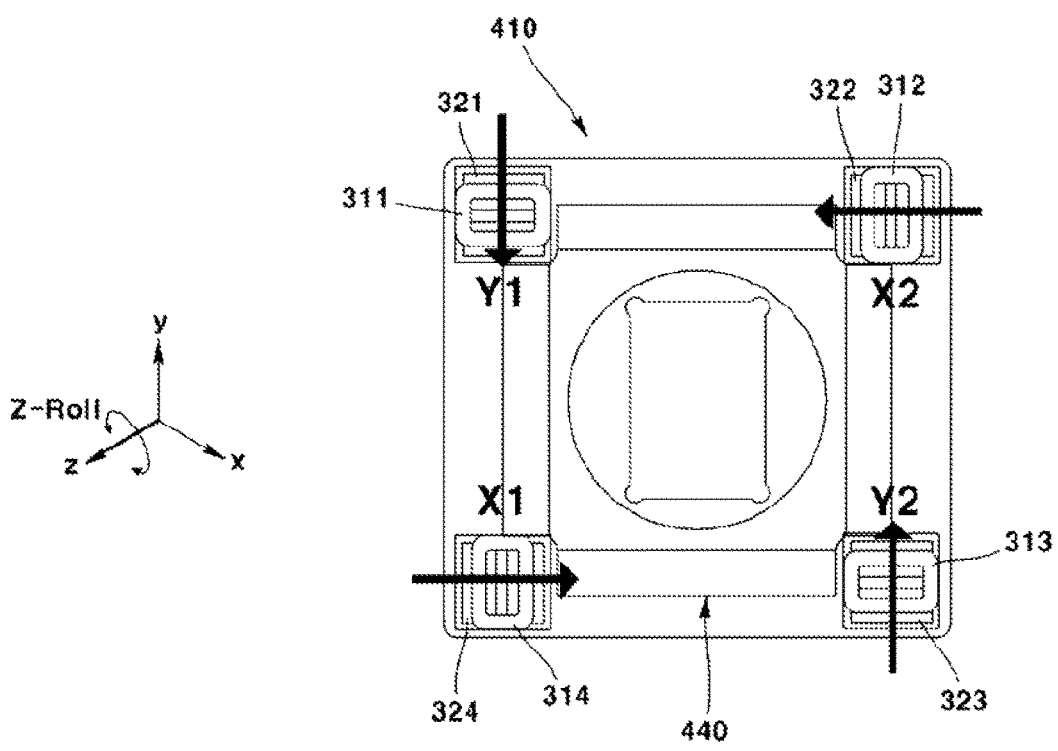
[FIG. 18]
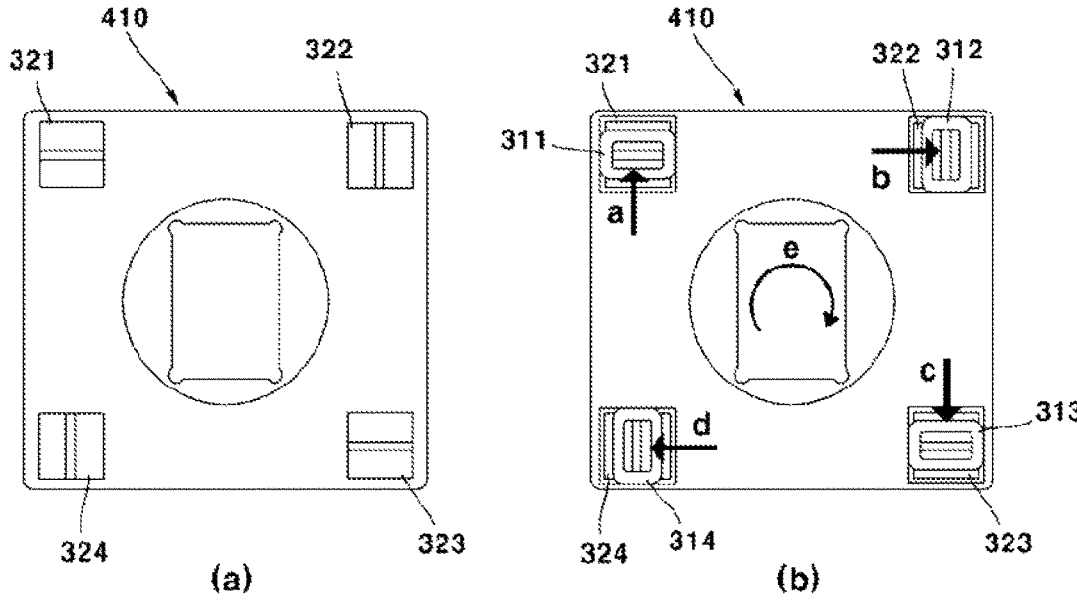
(a)            (b)

【FIG. 19】
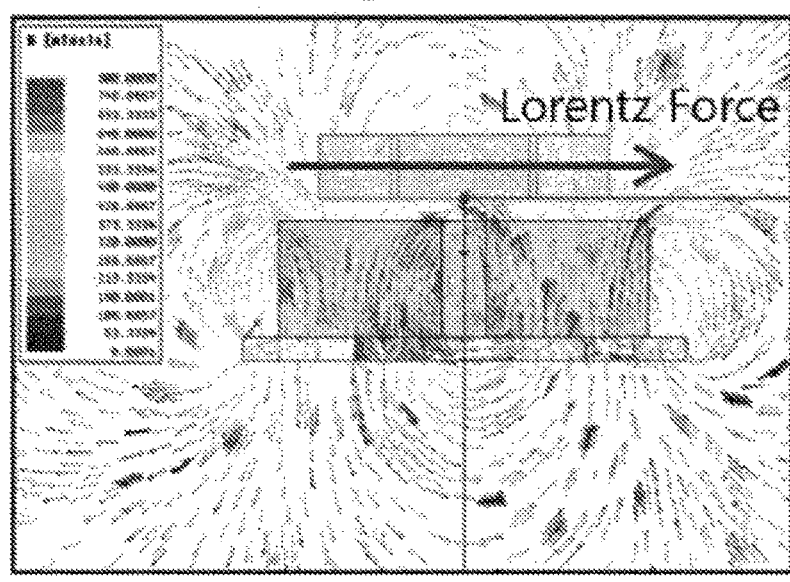
【FIG. 20】
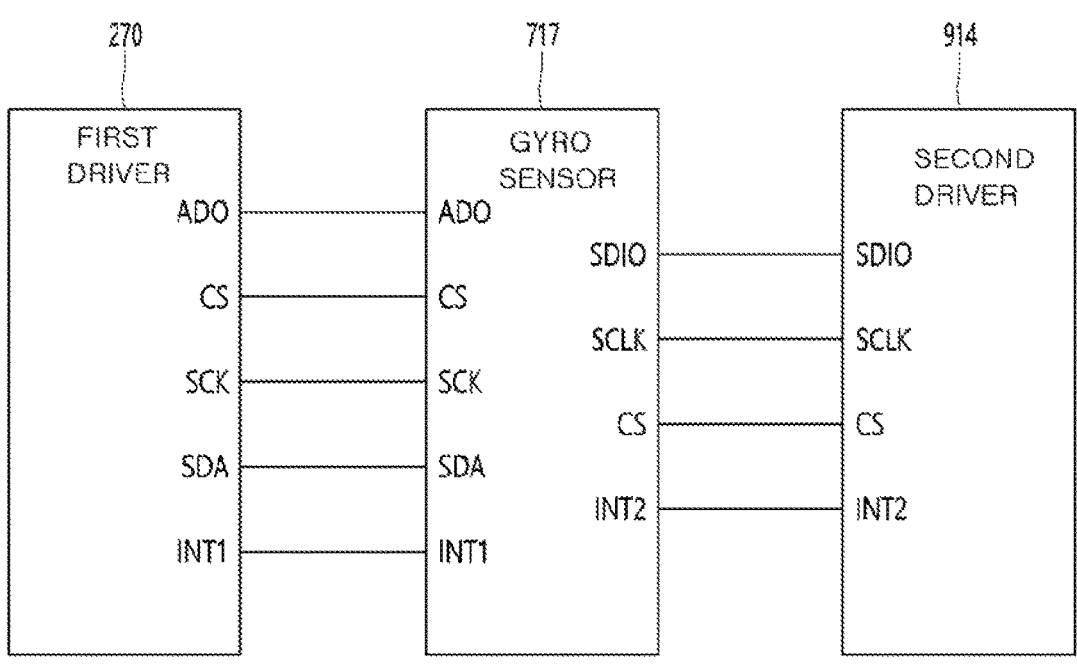

[FIG. 21]
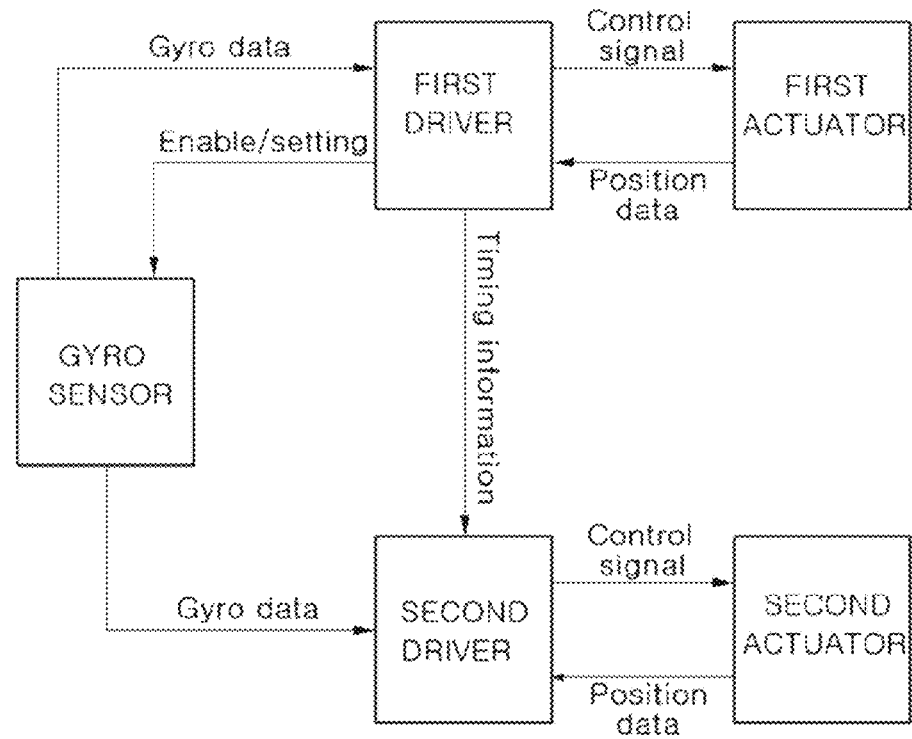
[FIG. 22]
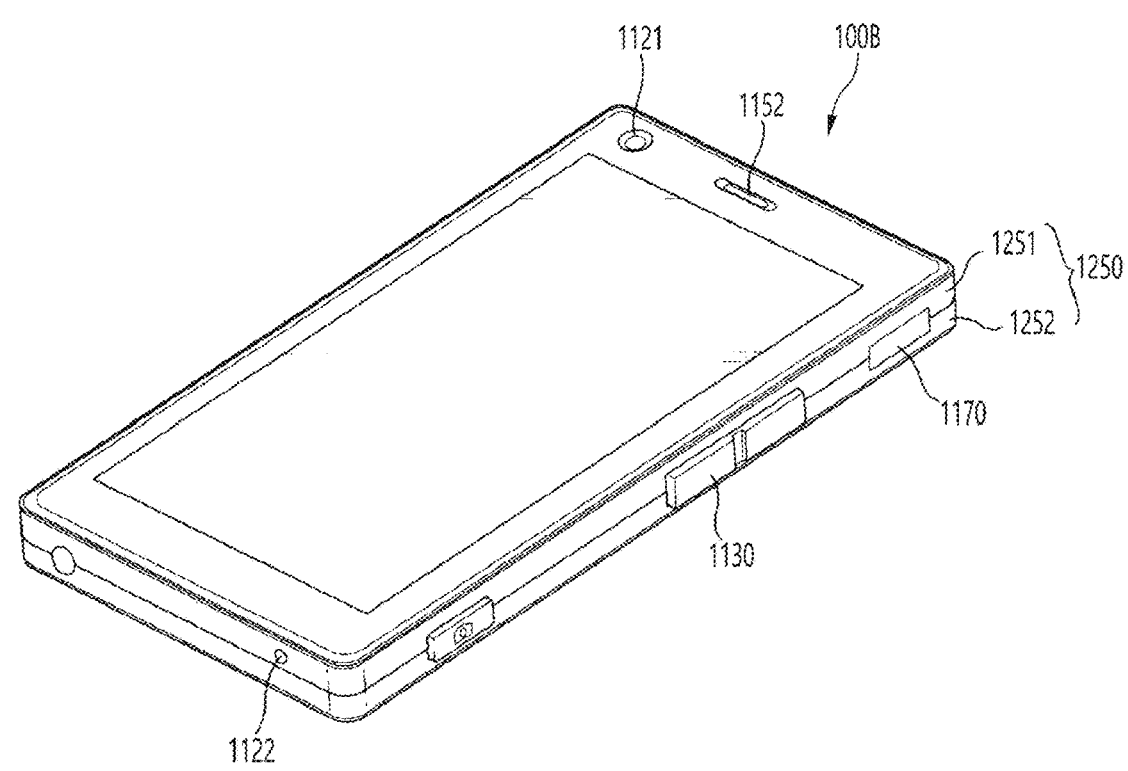

【FIG. 23】
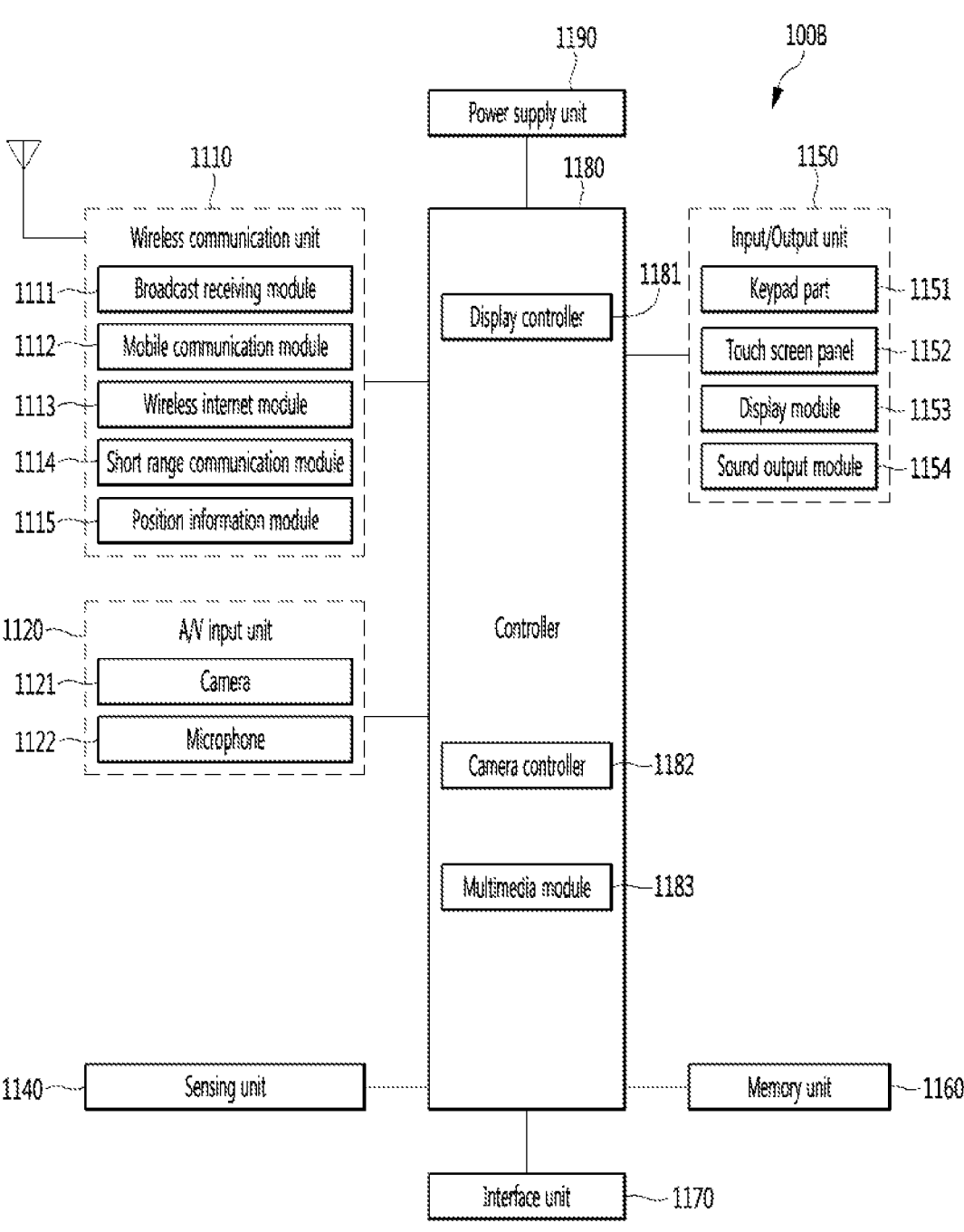

CAMERA DEVICE HAVING OPTICAL IMAGE STABILIZER FUNCTION

CROSS REFERENCE TO RELATED APPLICATIONS

This application is the National Phase of PCT/KR2021/018689 filed on Dec. 9, 2021, which claims priority under 35 U.S.C. 35 U.S.C. § 119 (a) to Patent Application Nos. 10-2020-0171203 and 10-2020-0182860 filed in the Republic of Korea on Dec. 9, 2020 and Dec. 24, 2020, respectively, all of which are hereby expressly incorporated by reference into the present application.

TECHNICAL FIELD

Embodiments relate to a camera device.

BACKGROUND ART

As various portable terminals are widely used and the wireless Internet service is commercialized, needs of consumers related to the portable terminals are diversified, and various kinds of additional devices are installed in the portable terminals.

A representative one of them is a camera device for photographing a subject in a photograph or a moving image. Meanwhile, recent camera devices employ a camera shake correction function for preventing a phenomenon in which an image shakes due to camera shake of a photographer.

However, the lens shift in a x-axis/y-axis directions used in a conventional camera shake correction module has a limitation in correcting various kinds of camera shake.

DISCLOSURE

Technical Problem

A present embodiment provides a camera device capable of correcting for camera shake by shifting in a x-axis direction, shifting in a y-axis direction, and rotating around a z-axis.

In addition, the present embodiment provides a camera device in which camera shake correction through a lens and camera shake correction through an image sensor are simultaneously performed.

In addition, the present embodiment provides a camera device capable of simplifying a spring structure for providing an auto focus function or a camera shake correction function.

In addition, the embodiment provides a camera device capable of substantially reducing a number of wires required to move an image sensor.

In addition, the present embodiment provides a camera device including a first actuator for an auto focus function and a second actuator for an image stabilization function configured separately from the first actuator.

In addition, the present embodiment provides a camera device capable of synchronizing operations of the plurality of actuators by driving a plurality of actuators based on gyro data obtained through a single gyro sensor.

In addition, the embodiment provides a camera device in which, in a device including a plurality of actuators, driving conditions of the plurality of actuators can be determined using gyro data obtained at the same position and at the same time.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A camera device according to an embodiment comprises: an image sensor including a plurality of connection pins; and a substrate having an open region formed in a region where the image sensor is disposed and including terminals connected to the plurality of connection pins of the image sensor; wherein a number of the plurality of connection pins of the image sensor is greater than a number of the terminals of the substrate, wherein one surface of the substrate includes a first region and a second region facing each other in a first direction with the open region therebetween; and a third region and a fourth region facing each other in a second direction different from the first direction with the open region therebetween; and wherein a number of terminals disposed in each of the first to fourth regions is the same.

In addition, the substrate includes a plurality of first terminals connected to an image signal output pin of the image sensor, and the plurality of first terminals are disposed spaced apart from each other in the same region among the first to fourth regions of the substrate, or disposed adjacent to each other in other regions adjacent to each other among the first to fourth regions of the substrate.

In addition, the plurality of first terminals includes a first-first terminal and a first-second terminal disposed spaced apart from each other in the first region; a first-third terminal disposed adjacent to the first region in the third region; and a first-fourth terminal disposed adjacent to the first region in the fourth region.

In addition, the substrate includes a second terminal connected to a monitoring pin of the image sensor, and the second terminal is disposed between the first-first terminal and first-second disposed in the same region.

In addition, the substrate includes a plurality of third terminals connected to a clock signal output pin of the image sensor, and the plurality of third terminals are disposed spaced apart from the first-third terminal in the third region.

In addition, the substrate includes a fourth terminal connected to a master clock input pin of the image sensor, and the fourth terminal is disposed between the first-third terminal and the third terminal, and wherein a signal voltage level of the fourth terminal is lower than a signal voltage level of the second terminal.

In addition, the substrate includes a plurality of fifth terminals connected to a power input pin of the image sensor, wherein the plurality of fifth terminals include a fifth-first terminal disposed in the third region facing the first region; and a fifth-second terminal disposed in the fourth region and spaced apart from the fifth-fourth terminal; and wherein a power input level of the fifth-first terminal is greater than a power input level of the fifth-second terminal.

In addition, the substrate includes a sixth terminal connected to an initial synchronization communication pin of the image sensor and a seventh terminal connected to a reset pin of the image sensor, and wherein the sixth terminal and the seventh terminal are disposed in the second region together with the fifth-first terminal.

In addition, a signal voltage level of each of the sixth and seventh terminals are greater than a signal voltage levels of each of the second terminal and the fourth terminal.

In addition, the substrate includes an eighth terminal connected to a ground pin of the image sensor, and wherein the eighth terminal is disposed between the first-fourth terminal and the fifth-second terminal.

In addition, the eighth terminal includes a single eighth-first terminal for a ground of power input through the fifth-first terminal and a single eight-second terminal for a ground of the plurality of first terminals.

Meanwhile, a camera device according to an embodiment comprises a fixed part including a second substrate, a coil disposed on the second substrate, and a first lead pattern part; a moving part spaced apart from the fixed part and including an image sensor; and a wire part disposed between the moving part and the fixed part, wherein one end of the wire part is connected to the first lead pattern part and the other end is connected to the moving part to elastically support the moving part, wherein the moving part includes the image sensor substrate.

In this case, the wire part includes a plurality of wires, and a number of the plurality of wires is smaller than a number of input pins included in the image sensor.

In addition, the moving part includes a second lead pattern part, the other end of the wire part is connected to the second lead pattern part, and a number of the second lead pattern parts is smaller than a number of input pins included in the image sensor.

A camera device according to an embodiment includes a first actuator; a second actuator; and a gyro sensor outputting gyro data to the first and second actuators, wherein the first actuator performs at least one function of auto focusing and optical image stabilization (OIS), and the second actuator performs at least one function of OIS and auto focusing, and the gyro sensor includes a first interface unit connected to the first actuator and a second interface unit connected to the second actuator, and the first actuator and the second actuator are commonly connected to the gyro sensor through the first interface and the second interface.

In addition, the first actuator includes a first driver IC connected to the first interface unit of the gyro sensor, and the second actuator includes a second driver IC connected to the second interface unit of the gyro sensor.

In addition, the camera device includes an image sensor, the second actuator includes a second driving part for moving a position of the image sensor based on the gyro data, and the second driver IC outputs a control signal to the second driving part based on the gyro data.

In addition, one of the first driver IC and the second driver IC is set as a master, and the driver IC set as the master provides a timing signal for reading the gyro data to another driver IC.

In addition, the second actuator may include a fixed part including a magnet holder, a magnet part coupled to the magnet holder, and a first substrate disposed on the magnet holder and including a first lead pattern part; a moving part spaced apart from the fixed part and including an image sensor; and a wire part disposed between the moving part and the fixed part, wherein one end of the wire part is connected to the first lead pattern part and the other end is connected to the moving part to elastically support the moving part.

In addition, the moving part includes a second lead pattern part, and the other end of the wire part is connected to the second lead pattern part.

In addition, the second lead pattern part includes a body portion, a coupling portion coupled to the other end of the wire part, and a connection portion connecting the body portion and the coupling portion.

In addition, the first lead pattern part includes a plurality of first lead patterns, the second lead pattern part includes a plurality of second lead patterns, the wire part includes a plurality of wires, and a number of the plurality of wires is less than or equal to a number of each of the plurality of first lead patterns and the plurality of second lead patterns.

In addition, the moving part may include an insulating layer on which the second lead pattern part is disposed, and the coupling portion is disposed not to overlap with the insulating layer in the optical axis direction.

In addition, the moving part includes a second substrate on which a coil part facing the magnet part is disposed and including a first pad part; and a third substrate including a second pad part disposed between the second lead pattern part and connected to the first pad part, and a third pad part electrically connected to the second lead pattern part.

In addition, the second actuator includes a substrate holder disposed between the second substrate and the second lead pattern part.

In addition, the second actuator includes a sensor substrate on which the image sensor is disposed, and the third substrate includes an opening on which the sensor substrate is disposed.

On the other hand, the camera device according to the embodiment includes a lens module; an image sensor; a first actuator that changes a state of the lens module; a second actuator that changes a state of the image sensor; and a gyro sensor configured to obtain gyro data for changes in a state of the lens module and a state of the image sensor, wherein the first actuator includes a first driver IC, and the second actuator includes a second driver IC, and wherein the gyro sensor includes a dual interface respectively connected to the first driver IC and the second driver IC.

Effects of the Invention

According to the embodiment, in order to realize OIS and AF functions of the camera module, instead of moving the conventional lens barrel, the image sensor is moved relative to the lens barrel in the X-axis, Y-axis, and Z-axis directions. Accordingly, the camera module according to the embodiment may remove a complicated spring structure for realizing the OIS and AF functions, thereby simplifying a structure. In addition, the structure that is more stable than the existing one may be formed by moving the image sensor according to the embodiment relative to the lens barrel.

In addition, according to the embodiment, the terminal portion electrically connected to the image sensor has a spring structure and is disposed to be floated at a position not overlapped with the insulating layer in the vertical direction. Accordingly, the camera module may move the image sensor relative to the lens barrel while supporting the image sensor stably and elastically.

According to the above-described embodiment, a X-axis direction shift, a Y-axis direction shift, and a Z-axis-centered rotation corresponding to camera shake with respect to the image sensor may be performed, and accordingly, the camera shake correction with respect to the lens corresponding to the camera shake correction with respect to the image sensor may be performed together, thereby providing a more enhanced camera shake correction function.

In addition, according to the embodiment, it is possible to reduce a total height of the camera device by embedding electrical elements required for a camera circuit by utilizing an internal space of the second actuator for moving the image sensor relative to the lens barrel.

Further, according to the embodiment, a camera assembly process may be simplified by integrating and fusing components of the camera circuit and components of the second actuator.

In addition, according to the embodiment, the number of terminals connected to the image sensor can be substantially reduced. In this case, according to the embodiment, by minimizing mutual interference with the arrangement of terminals connected to the image sensor, even if the number of terminals is reduced, a similar level of reliability to the conventional one can be secured. In addition, according to the embodiment, by reducing the number of terminals connected to the image sensor, it is possible to reduce the number of p components required for shifting the image sensor. In addition, according to the embodiment, by reducing the number of components as described above, it is possible to reduce the product cost and reduce an overall height of the camera device.

In addition, according to the embodiment, AF is performed using a first actuator that implements a lens shift method, and OIS is performed using a second actuator that implements an image sensor shift method, and accordingly, the reliability of the camera device can be improved.

In addition, according to the embodiment, the operation of the first actuator and the second actuator is performed using a gyro sensor supporting a 6-axis (eg, 3-axis accelerometer and 3-axis gyroscope) dual interface. Specifically, the first actuator and the second actuator need to receive gyro data from the gyro sensor in order to implement an auto focus function and a camera shake correction function. In this case, the embodiment allows gyro data obtained from a single gyro sensor supporting a dual interface to be provided to the first and second actuators. In an embodiment, the operation of the first actuator and the second actuator is performed based on gyro data obtained at the same time and position, and accordingly, mutual correction operations of the auto focus function and the camera shake correction function can be synchronized, and the reliability can be improved. In addition, according to the embodiment, the accuracy of the autofocus function and the camera shake correction function may be improved as the first actuator and the second actuator are operated based on gyro data obtained at the same time and position.

DESCRIPTION OF DRAWINGS

FIG. 1 is a view showing a camera module according to a comparative example.

FIG. 2 is a perspective view of a camera device according to a present embodiment.

FIG. 3 is a cross-sectional view taken along line A-A in FIG. 2.

FIG. 4 is a cross-sectional view taken along line B-B in FIG. 2

FIG. 5 is an exploded perspective view of a part of a configuration of the camera device according to the present embodiment.

FIG. 6 is an exploded perspective view of a part of a configuration of the camera device according to the present embodiment.

FIG. 7 is a bottom perspective view of a part of a configuration of the camera device according to the present embodiment.

FIG. 8 is a perspective view of a part of a configuration of the camera device according to the present embodiment.

FIG. 9A is an exploded perspective view of an image sensor substrate module of the camera device according to the present embodiment.

FIG. 9B is a cross-sectional view taken along line C-C in a state in which the image sensor substrate module of the camera device of FIG. 9A is coupled.

FIG. 9C is a cross-sectional view taken along line D-D in a state in which the image sensor substrate module of the camera device of FIG. 9A is coupled.

FIGS. 10 and 11*a*-11*c* are exploded perspective views of a part of a configuration of the camera device according to the present embodiment as viewed from a direction different from that of FIG. 9A.

FIG. 12 is an exploded perspective view of an image sensor module of the camera device according to the present embodiment.

FIG. 13 is an exploded perspective view of the image sensor module of the camera device according to the first embodiment as viewed from a direction different from that of FIG. 12.

FIG. 14 is a plan view of an image sensor substrate according to the embodiment.

FIG. 15 is a view for describing an x-axis direction shift drive through a part of a configuration of the camera device according to the present embodiment.

FIG. 16 is a view for describing a y-axis direction shift drive through a part of a configuration of the camera device according to the present embodiment.

FIG. 17 is a view for describing a z-axis-centered rotational drive through a part of a configuration of the camera device according to the present embodiment.

(*a*) of FIG. 18 is a view illustrating magnets disposed on a substrate holder together with an x-axis and a y-axis.

(*b*) of FIG. 18 is a view illustrating the substrate holder, the magnets, and coils together with a z-axis direction rotational drive.

FIG. 19 is a view illustrating a magnetic flow and a Lorentz force between a magnet and a coil of the camera device according to the present embodiment.

FIG. 20 is a view illustrating a connection relationship between a driver IC and a gyro sensor according to an embodiment.

FIG. 21 is a view for describing an operation of a driver IC according to an embodiment.

FIG. 22 is a perspective view of an optical device according to the present embodiment.

FIG. 23 is a configuration diagram of the optical device shown in FIG. 22.

BEST MODE

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art. Further, the terms used in the embodiments of the present invention are for describing the embodiments and are not intended to limit the present invention.

In this specification, the singular forms may also include the plural forms unless specifically stated in the phrase, and may include at least one of all combinations that may be combined in A, B, and C when described in "at least one (or more) of A (and), B, and C". Further, in describing the elements of the embodiments of the present invention, the terms such as first, second, A, B, (A, and (b) may be used.

These terms are only used to distinguish the elements from other elements, and the terms are not limited to the essence, order, or order of the elements. In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

Hereinafter, an embodiment of the present disclosure will be described in detail with reference to the accompanying drawings.

FIG. 1 is a view showing a camera module according to Comparative Example.

A camera module having an optical image stabilizer (OIS) function and an Auto Focusing (AF) function requires at least two spring plates.

The camera module according to the comparative example may have two spring plates. The camera module according to the comparative example requires an elastic member such as at least six springs for the spring plate.

Referring to FIG. 1, the camera module according to the comparative example includes an optical system including a lens assembly, an infrared cut-off filter, and a sensor unit. That is, the camera module according to the comparative example includes a lens barrel 10, a lens assembly 20, a first elastic member 31, a second elastic member 32, a first housing 41, a housing 42, an infrared cut-off filter 50, a sensor unit 60, a circuit board 80, and drivers 71, 72, and 74.

In this case, the lens barrel 10 is connected to the first housing 41. That is, the lens barrel 10 is connected to the first housing 41 via the first elastic member 31. That is, the lens barrel 10 is connected to the first housing 41 so as to be movable by the first elastic member 31. In this case, the first elastic member 31 includes a plurality of springs (not shown). For example, the first elastic member 31 connects between the lens barrel 10 and the first housing 41 at a plurality of points of the lens barrel 10.

The second elastic member 32 is connected to the first housing 41 and the second housing 42 accommodating the first housing 41. The second elastic member 32 fixes the first housing 41 to the second housing 42 so as to be movable. The second elastic member 32 includes a plurality of springs. In detail, the second elastic member 32 includes a plate-shaped spring.

In this case, the first elastic member 31 moves the lens barrel 10 relative to the sensor unit 60 in a vertical direction (a Z-axis direction) while supporting the lens barrel 10. To this end, the first elastic member 31 includes at least four springs.

In addition, the second elastic member 32 moves the lens barrel 10 relative to the sensor unit 60 in a horizontal direction (an X-axis direction and a Y-axis direction) while supporting the lens barrel 10. To this end, the second elastic member 32 includes at least two springs.

As described above, in the camera module according to the comparative example, OIS and AF are performed as the lens barrel 10 moves in X-axis, Y-axis, and Z-axis directions. To this end, the camera module according to the comparative example requires at least six elastic members such as springs. In addition, the camera module according to the comparative example requires two spring plates for supporting the elastic member as described above. Further, the camera module according to the comparative example requires an additional member such as an elastic wire for fixing the Z-axis of the lens barrel 10. Therefore, the camera module according to the comparative example has a complicated spring structure for moving the lens barrel in the X-axis, Y-axis and Z-axis directions.

In addition, in the camera module according to the comparative example, it is necessary to manually perform an operation of bonding the respective elastic members in order to couple the elastic member with the lens barrel 10. Accordingly, the camera module according to the comparative example has a complicated manufacturing process and requires a long manufacturing time.

In addition, the camera module according to the comparative example provides a tilt function of the lens barrel 10, but has a structure in which tilt correction of an image is substantially difficult. That is, even though the lens barrel 10 rotates with respect to the sensor unit 60, an image incident on the sensor unit 60 does not change, and thus the tilt correction of the image is difficult, and further, the tilt function itself is unnecessary.

Hereinafter, an image sensor substrate, a camera module, and a camera device including the same according to an embodiment will be described.

"Optical axis direction" used below is defined as an optical axis direction of a lens and/or an image sensor coupled to a lens driving device.

"Vertical direction" used below may be a direction parallel to the optical axis direction. The vertical direction may correspond to "z-axis direction". "Horizontal direction" used below may be a direction perpendicular to the vertical direction. That is, the horizontal direction may be a direction perpendicular to the optical axis. Therefore, the horizontal direction may include "x-axis direction" and "y-axis direction".

"Auto focus function" used below is defined as a function for automatically adjusting a focus on a subject by adjusting a distance from an image sensor and moving a lens in the optical axis direction according to the distance of the subject so that a clear image of the subject may be obtained on the image sensor. Meanwhile, "auto focus" may correspond to "AF (Auto Focus)".

"Camera shake correction function" used below is defined as a function of moving the lens and/or the image sensor so as to cancel vibration (movement) generated in the image sensor by external force. Meanwhile, "Camera shake correction function" may correspond to "Optical Image Stabilization (OIS).

FIG. 2 is a perspective view of a camera device according to a present embodiment, FIG. 3 is a cross-sectional view taken along line A-A in FIG. 2, FIG. 4 is a cross-sectional view taken along line B-B in FIG. 2, FIG. 5 is an exploded perspective view of a part of a configuration of the camera device according to the present embodiment, FIG. 6 is an exploded perspective view of a part of a configuration of the camera device according to the present embodiment, FIG. 7 is a bottom perspective view of a part of a configuration of the camera device according to the present embodiment, FIG. 8 is a perspective view of a part of a configuration of the camera device according to the present embodiment, FIG. 9A is an exploded perspective view of an image sensor substrate module of the camera device according to the present embodiment, FIG. 9B is a cross-sectional view taken along line C-C in a state in which the image sensor substrate module of the camera device of FIG. 9A is coupled, FIG. 9C is a cross-sectional view taken along line D-D in a state in which the image sensor substrate module of the camera device of FIG. 9A is coupled, FIGS. 10 and 11 are exploded perspective views of a part of a configuration of the camera device according to the present embodiment as viewed from a direction different from that of FIG. 9A, FIG. 12 is an exploded perspective view of an image sensor module of the camera device according to the present embodiment, FIG. 13 is an exploded perspective view of the image sensor module of the camera device according to the first embodiment as viewed from a direction different from that of FIG. 12, FIG. 14 is a plan view of an image sensor substrate according to the embodiment, FIG. 15 is a view for describing an x-axis direction shift drive through a part of a configuration of the camera device according to the present embodiment, FIG. 16 is a view for describing a y-axis direction shift drive through a part of a configuration of the camera device according to the present embodiment, FIG. 17 is a view for describing a z-axis-centered rotational drive through a part of a configuration of the camera device according to the present embodiment, FIG. 18 (*a*) is a view illustrating magnets disposed on a substrate holder together with an x-axis and a y-axis, FIG. 18 (*b*) is a view illustrating the substrate holder, the magnets, and coils together with a z-axis direction rotational drive, and FIG. 19 is a view illustrating a magnetic flow and a Lorentz force between a magnet and a coil of the camera device according to the present embodiment.

A camera device 100A may include a camera module. The camera device 100A may include a lens driving device. The lens driving device may be a voice coil motor (VCM). The lens driving device may be a lens driving motor. The lens driving device may be a lens driving actuator. The lens driving device may include an AF module. The lens driving device may include an OIS module.

Firstly, an overall structure of the camera device according to the embodiment will be described.

The camera device may include a lens module 210.

The lens module 210 may include a lens and a lens barrel. The lens module 210 may include one or more lenses and a lens barrel accommodating the one or more lenses. However, one configuration of the lens module 210 is not limited to the lens barrel, and any holder structure capable of supporting one or more lenses may be used. The lens module 210 may move while being coupled to the first actuator 220. The lens module 210 may be coupled to an inside of the first actuator 220 as an example. Accordingly, the lens module 210 may move inside the first actuator 210 in response to the movement of the first actuator 210. The lens module 210 may be screwed to the first actuator 220. As an example, the lens module 210 may be coupled to the first actuator 220 by an adhesive (not shown). Meanwhile, light passing through the lens module 210 may be irradiated to an image sensor.

Meanwhile, the lens module 210 may include, for example, 5 lenses, but is not limited thereto.

A camera device may include an actuator.

Specifically, the camera device may include a first actuator 220 for shifting the lens module 210. The first actuator 220 may be an AF module. The first actuator 220 may move the lens module 210 in a vertical direction (specifically, in an optical axis direction). That is, the first actuator 220 may perform an auto focus function by moving the lens module 210 in the optical axis direction.

The second actuator may drive the image sensor module 440. The second actuator may shift or rotate the image sensor module 440. The second actuator may move the image sensor module 440. The second actuator may move the image sensor module 440 in a first direction perpendicular to the optical axis, move in a second direction perpendicular to the optical axis and the first direction, and rotate based on the optical axis. In this case, the first direction may be an x-axis direction, the second direction may be a y-axis direction, and the optical axis may be a z-axis direction.

Meanwhile, the first actuator 220 and the second actuator may include a driving part to move the lens module 210 and the image sensor module 440, respectively. That is, the first actuator 220 may include a first driving part (to be described later). Also, the second actuator may include a second driving part (to be described later). Each of the first and second driving parts may include a coil and a magnet. In addition, the coil and the magnet may generate mutual electromagnetic force to drive the lens module 210 and the image sensor module 440, respectively. The lens module 210 in one embodiment may include a solid lens. In addition, the first actuator 220 may include a first driving part including a coil and a magnet for moving the lens module 210 of the solid lens.

The image sensor module 440 may be coupled to the second actuator. Preferably, the second actuator may include a fixed part (to be described later) and a moving part (to be described later). In addition, the moving part of the second actuator may be connected to the fixed part through a wire (to be described later). The moving part of the second actuator may move relative to the fixed part by the electromagnetic force of the second driving part. Here, the movement of the fixed part may include both movement in a first direction, a movement in a second direction, and a movement in an optical axis direction of the fixed part.

In addition, the image sensor module 440 may be coupled to the moving part of the second actuator. The image sensor module 440 may include an image sensor 444. The image sensor 440 may be any one of a charge coupled device (CCD), a metal oxide semi-conductor (MOS), a CPD, and a CID.

In the present embodiment, the image sensor 444 may be rotated around the x-axis, y-axis, and z-axis. The image sensor 444 may be moved around the x-axis, y-axis, and z-axis. The image sensor 444 may be tilted around the x-axis, y-axis, and z-axis.

That is, the image sensor module 440 is coupled to the moving part of the second actuator, and when the moving part of the second actuator moves relative to the fixed part of the second actuator, it may move relative to the fixed part of the second actuator together with the moving part of the second actuator. As a result, the camera shake correction function can be performed.

As described above, in the embodiment, the AF function may be performed by moving the lens module using the first actuator 220, and the camera shake correction function may be performed by the second actuator. Alternatively, the second actuator may perform both the AF function and the camera shake correction function.

The camera device according to the present embodiment performs the camera shake correction function and/or an auto focus function by relatively moving the image sensor module 440 with respect to the lens module 210.

That is, image resolution is increasing with the recent development of camera technology, and accordingly, a size of the image sensor 440 is also increasing. In this case, in a situation where the size of the image sensor 440 increases, the size of the lens module 210 and components of an actuator for shifting the lens module 210 also increase. For this reason, a weight of other actuator components for shifting the lens module 210 as well as a weight of the lens module 210 itself is increasing, accordingly, it is difficult to stably shift the lens module 210 using a conventional VCM technology, and many problems are occurring in terms of reliability.

Accordingly, in the present embodiment, AF is performed using the first actuator 220 implementing a lens shift method, and OIS is executed using the second actuator implementing the image sensor shift method, thereby, the reliability of the camera device is improved.

Furthermore, there is a 5-axis camera shake in the camera shake of the camera device. For example, in the 5-axis camera shake, there are two camera shakes that are shaken at an angle, two camera shakes that is shaken by a shift, and one camera shake that are shaken by rotation. At this time, only the 4-axis camera shake correction is possible with the lens shift method, and the camera shake that are shaken in rotation cannot be corrected. This is because the camera shake caused by rotation should be corrected by rotation of the optical module, and even when the lens module 210 is rotated, an incident optical path is maintained as it is, and accordingly, the 5-axis camera shake correction is not possible with the lens shift method. Therefore, in the present embodiment, it is possible to solve a reliability problem of the lens shift method according to the development of the camera technology as described above, while applying the sensor shift method so as to enable the 5-axis camera shake correction.

Therefore, in the embodiment, a plurality of actuators are provided, and the lens module 210 and the image sensor are respectively moved using the plurality of actuators to perform AF and OIS.

Hereinafter, each component constituting the camera device 100A of the embodiment will be described in detail.

The camera device 100A may include a holder 110. The holder 110 may be disposed on a lower surface of a first substrate 150. The holder 110 may include a protrusion for coupling to a groove of the first substrate 150. The holder 110 may be disposed on an upper surface of a second substrate 120.

Here, the first substrate 150 may be a fixed part of the second actuator. That is, the first substrate 150 may remain fixed even when the image sensor 444 moves. That is, the image sensor 444 may move relative to the first substrate 150.

The holder 110 may be disposed between the first substrate 150 and the second substrate 120. A lens module 210 may be disposed on the holder 110. An optical module may be disposed on the holder 110. The holder 110 may be coupled to the housing 600. In this case, the second substrate 120 may be one configuration of a second actuator electrically connected to the image sensor 444. One end of the second substrate 120 may be connected to a third substrate 430, thereby receiving an image signal transmitted from the image sensor 444 coupled to the third substrate 430. In addition, the other end of the second substrate 120 may be connected to the first substrate 150, thereby transmitting the image signal provided from the image sensor 444 to the outside. That is, the second substrate 120 may transfer the image signal obtained from the image sensor 444 to a main substrate.

To this end, the first substrate 150 may be connected between the camera module and a main substrate of an external device. Specifically, the first substrate 150 may connect between the second substrate 120 of the camera module and a main substrate of an optical device (for example, a portable terminal).

To this end, a part of the first substrate 150 may be disposed inside the camera device to be connected to the second substrate 120 of the second actuator, and the other part may be disposed outside the camera device to be connected to the main substrate of the optical device.

The holder 110 may include a step 111. The step 111 may be formed around the inserting portion 112 of the holder 110. The lens module 210 may be disposed at the step 111. The step 111 may support a lower surface of a part of the lens module 210. Through this, it is possible to prevent the lens module 210 from being detached downward in a state in which the lens module 210 is placed on the step 111.

The holder 110 may include the inserting portion 112. The inserting portion 112 may be a hollow hole. The inserting portion 112 may be an opening. The lens module 210 may be disposed in the inserting portion 112. A part of the lens module 210 may extend below the step 111 through the inserting portion 112.

The holder 110 may include a first hole 113. The first hole 113 may be formed in order to expose a portion of the second substrate 120 to be coupled to a wire 510. The first hole 113 may be provided in plural. For example, the first hole 113 may be provided in two.

The holder 110 may include a second hole 114. The second hole 114 may be formed in order to expose a sensor 520 coupled to the second substrate 120. The second hole 114 may be provided in plural. For example, the second hole 114 may be provided in four.

The holder 110 may include a first groove 115. The first groove 115 may be formed in order to expose a portion of the second substrate 120 to be coupled to the wire 510. The first groove 115 may be formed on a side surface of the holder 110. The first grooves 115 may be formed on both side surfaces of the holder 110, respectively. The first groove 115 may be provided in plural. For example, the first groove 115 may include two grooves disposed on both side surfaces of the holder 110 facing each other.

The holder 110 may include a second groove 116. The second groove 116 may be formed in a shape corresponding to a protrusion of a housing 600 to be coupled to the protrusion of the housing 600. However, the second groove 116 may not be provided in the shape corresponding to the protrusion of the housing 600. The second groove 116 may be formed at the side surface of the holder 110. The second grooves 116 may be formed on both side surfaces of the holder 110, respectively. The second grooves 116 may be provided in plural. For example, three second grooves 116 may be provided in three. The second groove 116 may include two grooves disposed on one side surface of the holder 110, and may be formed as one groove of a form in which two grooves connected to one on the other side surface.

The camera device 100A may include the second substrate 120. The second substrate 120 may be disposed in the holder 110. The second substrate 120 may be disposed on a lower surface of the holder 110. The upper surface of the second substrate 120 may be in contact with the lower surface of the holder 110. Here, the second substrate 120 and the holder 110 may be a fixed part of the second actuator. That is, the positions of the second substrate 120 and the holder 110 may be fixed even when the image sensor 444 moves.

The second substrate 120 may be disposed under the first substrate 150. The second substrate 120 may be coupled to the wire 510. The second substrate 120 may be a rigid flexible PCB (RFPCB). The second substrate 120 may include first to fourth corners. In this case, the second substrate 120 may be coupled to the third substrate 430 on which the image sensor 444 is disposed, and may be a configuration of the second actuator for moving the third substrate 430.

The second substrate 120 may include a fourth open region 121. The fourth open region 121 may be formed at the center of the second substrate 120. The fourth open region 121 may be a hollow hole passing through the upper and lower surfaces of the second substrate 120. The fourth open region 121 may be an opening. The fourth open region 121 of the second substrate 120 may be aligned on an optical axis OA with the image sensor 444 disposed below and the lens module 210 disposed above.

Preferably, the fourth open region 121 may be aligned on the optical axis OA with the image sensor 444 disposed below, a first open region 433 of the third substrate 430, and a second open region 424 of a reinforcing member 420, and a third open region 411 of the substrate holder 410. The lens module 210 may be disposed on the fourth open region 211. The fourth open region 121 of the second substrate 120 may be formed to have a larger width than the insertion portion 112 of the holder 110.

The second substrate 120 may include a coupling portion. The second substrate 120 may be coupled to the wire 510 at the coupling portion. That is, the second substrate 120 may include a lead pattern part coupled to the wire 510. For example, the second substrate 120 may include a second lead pattern part 122 electrically connected to one end of the wire 510. The second lead pattern part 122 and the wire 510 of the second substrate 120 may be coupled by soldering. The second lead pattern part 122 may be a portion in which a solder register is opened to be electrically connected to the wire 510. A third insertion holes 123 into which wires are inserted may be formed in the second lead pattern part 122 and the second substrate 120. Accordingly, one end of the wire 510 may be inserted into the second lead pattern part 122 and the third insertion hole 123 of the second substrate 120. Preferably, one end of the wire 510 may pass through the surface of the second lead pattern part 122 to protrude onto a surface of the second lead pattern part 122, and may be electrically connected to the second lead pattern part 122.

That is, a part of the third insertion hole 123 may be formed in the second substrate 120, and the remaining of the third insertion hole 123 may be formed on the second lead pattern part 122. A part of the third insertion hole formed on the second lead pattern part 122 may be filled with solder by soldering the wire 510 protruding onto the surface of the second lead pattern part 122.

The second substrate 120 may include a connector 124. The connector 124 may be electrically connected to the first substrate 150. A connector corresponding to the connector 124 of the second substrate 120 may be disposed on the first substrate 150. The connector 124 may include a port for electrically connecting to an external device.

The second substrate 120 may include a terminal 125. The terminal 125 may be formed on a lower surface of the second substrate 120. The terminal 125 may be electrically connected to the coil 310. The terminal 125 may be coupled to a pair of leader wires of the coil 310 by soldering or Ag epoxy. The terminal 125 may include a plurality of terminals. The terminal 125 may include a total of eight terminals, two for each of four coils. The second substrate 120 generates a magnetic field on the third substrate 430 using the coil 310, and allows a position of the third substrate 430 to be moved by the generated magnetic field.

That is, the second substrate 120 may be electrically connected to the third substrate 430 disposed below via a wire 510. In addition, the third substrate 430 may move relative to the first substrate 150 and the second substrate 120 via the wire 510.

In other words, the second substrate 120 may be fixedly coupled to the holder 110, and the third substrate 430 may move relative to the second substrate 120. Movement of the third substrate 430 may be achieved by a magnetic force generated from the coil 310 connected to the terminal 125. This will be described below.

The camera device 100A may include the lens module 210. The lens module 210 may be disposed in the holder 110. The lens may be disposed at a position corresponding to the image sensor 444. The lens module 210 may include at least one lens. The lens module 210 may include a plurality of lenses. The lens module 210 may include five lenses. The lens module 210 may include first to fifth lenses 211, 212, 213, and 214, and 215. The lens module 210 may include a barrel 216. A plurality of lenses may be disposed in the barrel 216. The lens module 210 may include a hole 217. The optical module may be disposed in the hole 217 of the lens module 210. The hole 217 of the lens module 210 may be formed so as to pass through the lens module 210 between the plurality of lenses in a horizontal direction. Through this, the optical axis of the plurality of lenses and the optical axis of the optical module may be aligned. The hole 217 of the lens module 210 may be formed between the second lens 212 and the third lens 213.

The camera device 100A may include the optical module. The optical module may perform OIS function. The optical module may perform AF function. The optical module may be disposed to be aligned with the plurality of lenses and the image sensor 444. The optical module may be disposed between the plurality of lenses. The optical module may be disposed between the second lens 212 and the third lens 213. The optical module may include a first actuator 220.

As shown in FIG. 8, the camera device 100A may include the first actuator 220. The first actuator 220 may move a moving lens using a silicon wafer to perform an auto focus function and/or a camera shake correction function.

The first actuator 220 may be connected to a lens substrate 221. The lens substrate 221 may include a terminal 222. The terminal 222 may include a plurality of terminals. Terminal 222 may include six terminals. The terminal 222 of the lens substrate 221 may be connected to a terminal 150a of the first substrate 150. The first actuator 220 of FIG. 8 shows an example of a structure of an actuator, and the first actuator 220 may drive the lens module 210 in a VCM method.

The camera device 100A may include the coil 310. That is, the second actuator for moving the image sensor 444 may include the coil 310.

The coil 310 may be disposed on the second substrate 120.

The coil 310 may be electrically connected to the second substrate 120. The coil 310 may be disposed facing the magnet 320 disposed below. When a current is applied to the coil 310, an electric field may be formed around the coil 310. When a current is applied to the coil 310, any one of the coil 310 and the magnet 320 may move relative to the other by electromagnetic interaction between the coil 310 and the magnet 320. At this time, the coil 310 may also be a component of the fixed part of the second actuator.

The coil 310 may include four coils. A current may be independently applied to at least three of the four coils. In the first embodiment, the coil 310 may be controlled by three channels. Alternatively, in the second embodiment, the coil 310 may be controlled by four channels. The four coils 310 may be electrically isolated from each other. Any one of a forward current and a reverse current may be selectively applied to each of the four coils 310. In this embodiment, only three of the four coils may be electrically isolated and one coil may be electrically connected to the other coil. Alternatively, all four coils may be electrically isolated. When only three of the four coils are electrically isolated, a total of six lead wires of three pairs may come out from the coil 310, and when all four coils are electrically isolated, a total of eight lead wires of four pairs may come out from the coil 310.

When the four coils are controlled by three channels as in the first embodiment of the present embodiment, a pair of the coil 310 and the magnet 320 should be driven in a z-axis-centered rotational drive, but when the four coils are controlled by four channels as in the second embodiment, two pair of the coil 310 and the magnet 320 may be driven in the z-axis-centered rotational drive.

The coil 310 may include first to fourth coils 311, 312, 313, and 314. The first coil 311 may be disposed to face a first magnet 321. The second coil 312 may be disposed to face a second magnet 322. The third coil 313 may be disposed to face a third magnet 323. The fourth coil 314 may be disposed to face a fourth magnet 324. The first coil 311 may be disposed in a first corner of the second substrate 120. The second coil 312 may be disposed in a second corner of the second substrate 120. The third coil 313 may be disposed in a third corner of the second substrate 120. The fourth coil 314 may be disposed in a fourth corner of the second substrate 120. The first coil 311 and the third coil 313 may be disposed on a first diagonal direction of the second substrate 120, and the second coil 312 and the fourth coil 314 may be disposed on a second diagonal direction of the second substrate 120.

In the present embodiment, the first coil 311 and the third coil 313 may be disposed to be long in a first direction, and the second coil 312 and the fourth coil 314 may be disposed to be long in a second direction. In this case, the first direction and the second direction may be perpendicular. A long side of the first coil 311 and a long side of the third coil 313 may be disposed in parallel to each other. A long side of the second coil 312 and a long side of the fourth coil 314 may be disposed in parallel to each other. The long side of the first coil 311 and the long side of the second coil 312 may not be parallel to each other. In this case, the long side of the first coil 311 and the long side of the second coil 312 may be disposed such that virtual extension lines are orthogonal to each other. An arrangement direction of the first coil 311 and an arrangement direction of second coil 312 may be orthogonal to each other.

In the present embodiment, a current may be independently applied to at least three coils among the first to fourth coils 311, 312, 313, and 314. The first to fourth coils 311, 312, 313, and 314 may be electrically isolated from each other.

The camera device 100A may include the magnet 320. The magnet 320 may be disposed in the substrate holder 410. The magnet 320 may be disposed at a corner of the substrate holder 410. The magnets 320 may be disposed at four corners of the substrate holder 410, respectively. The magnet 320 may face the coil 310. The magnet 320 may electromagnetically interact with the coil 310. The magnet 320 may move by electromagnetic interaction with the coil 310. That is, when a current is applied to the coil 310, the magnet 320 may move. The magnet 320 may be a flat magnet having a flat plate shape. In the present embodiment, the coil 310 may be fixed and the magnet 320 may move. However, as a modified example, arrangement positions of the coil 310 and the magnet 320 may be changed from each other. In this case, the magnet 320 and the substrate holder 410 may be a moving part of the second actuator. That is, the magnet 320 and the substrate holder 410 may move together with the image sensor 444 when the image sensor 444 moves.

The magnet 320 may include a plurality of magnets. The magnet 320 may include four magnets. The magnet 320 may include first to fourth magnets 321, 322, 323, and 324. The first magnet 321 may face the first coil 311. The first magnet 321 may be disposed in a first corner 410e of the substrate holder 410. The second magnet 322 may face the second coil 312. The second magnet 322 may be disposed in a second corner 410f of the substrate holder 410. The third magnet 323 may face the third coil 313. The third magnet 323 may be disposed in a third corner 410g of the substrate holder 410. The fourth magnet 324 may face the fourth coil 314. The fourth magnet 324 may be disposed in a fourth corner 410h of the substrate holder 410. Each of the plurality of magnets may be disposed perpendicular to adjacent magnets and may be disposed in parallel with magnets disposed in a diagonal direction.

A polarity of a surface of the first magnet 321 facing the coil 310 may be different between a portion close to a first side surface and a portion close to a second side surface. A polarity of a surface of the second magnet 322 facing the coil 310 may be different between a portion close to a third side surface and a portion close to a fourth side surface. A polarity of a surface of the third magnet 323 facing the coil 310 may be different between a portion close to the first side surface and a portion close to the second side surface. A polarity of a surface of the fourth magnet 324 facing the coil 310 may be different between a portion close to the third side surface and a portion close to the fourth side surface. That is, the first magnet 321 and the third magnet 323 may be disposed in the same direction, and the second magnet 322 and the fourth magnet 324 may be disposed in the same direction. The first magnet 321 may be disposed perpendicular to the second magnet 322. Polarities of the first to fourth magnets 321, 322, 323, and 324 may be the same for inner portions. The polarities of the first to fourth magnets 321, 322, 323, and 324 may be the same for outer portions. Regarding the polarity of each of the first to fourth magnets 321, 322, 323, and 324, the inner portions may be formed as an N pole. Regarding the polarity of each of the first to fourth magnets 321, 322, 323, and 324, the outer portions may be formed as the S pole. However, as a modification, regarding the polarity of each of the first to fourth magnets 321, 322, 323, and 324, the inner portions may be formed as a S pole and the outer portions may be formed as the N pole.

As shown in FIG. 13, when currents in the same direction are applied to the second coil 312 and the fourth coil 314 in the present embodiment, the image sensor 444 coupled to the substrate holder 410 may be moved (shifted) in the x-axis direction by electromagnetic interaction between the second magnet 322 and the fourth magnet 324, respectively. That is, the second coil 312, the second magnet 322, and the fourth coil 314 and the fourth magnet 324 may be used for the x-axis direction shift drive of the image sensor 444. In this case, the second coil 312 and the second magnet 322 may be a first x-axis shift driver X2, and the fourth coil 314 and the fourth magnet 324 may be a second x-axis shift driver X1.

As shown in FIG. 15, when currents in the same direction are applied to the first coil 311 and the third coil 313 in the present embodiment, the image sensor 444 coupled to the substrate holder 410 may be moved (shifted) in the y-axis direction by electromagnetic interaction between the first magnet 321 and the third magnet 323, respectively. That is, the first coil 311, the first magnet 321, the third coil 313, and the third magnet 323 may be used for the y-axis direction shift drive of the image sensor 444. In this case, the first coil 311 and the first magnet 321 may be a first y-axis shift driver Y1, and the third coil 313 and the third magnet 323 may be a second y-axis shift driver Y2.

As shown in FIG. 16, currents in opposite directions are applied to the first coil 311 and the third coil 313 and currents in opposite directions are applied to the second coil 312 and the fourth coil 314 in the present embodiment, and at this time, when a direction in which the magnet 320 is rotated by the current applied to the first coil 311 and the current applied to the second coil 312 is the same, the image sensor 444 coupled to the substrate holder 410 may be rotated (rolled) around the z-axis. An embodiment shown in FIG. 17 illustrates a case in which the coil 310 is controlled by four channels, and when the coil 310 is controlled by three channels, the image sensor 444 may be rolled by the first coil 311 and the third coil 313 or the second coil 312 and the fourth coil 314. This is because when there is a coil bundled into one channel among the first coil 311 and the third coil 313, and the second coil 312 and the fourth coil 314, the current may not be applied in the opposite direction.

As shown in FIG. 17B, in the present embodiment, a forward current is applied to the first coil 311, whereby the first coil 311 pushes out the first magnet 321 in the first direction (see FIG. 17A), a forward current is applied to the second coil 312, whereby the second coil 312 pushes out the second magnet 322 in the second direction (see FIG. 17B), a reverse current is applied to the third coil 313, whereby the third coil 313 pushes out the third magnet 323 in a third direction (see FIG. 17C), and a reverse current is applied to the fourth coil 314, whereby the fourth coil 314 pushes out the fourth magnet 324 in a fourth direction (see in FIG. 17D), so that the image sensor 444 coupled to the substrate holder 410 may be rotated around the z-axis (see in FIG. 17E). In this case, the first to fourth directions may correspond to a clockwise direction around the center of the substrate holder 410.

In the present embodiment, a magnetic flow of the magnet 320 is shown in FIG. 18. Referring to FIG. 18, it may be confirmed that lines of magnetic force passing perpendicular to the coil 310 exists, and when a current is applied to the coil 310 in this state, the coil 310 may move with respect to the magnet 320 by the Lorentz force.

The camera device 100A may include the substrate holder 410 which is one configuration of a substrate module. The substrate holder 410 may be spaced apart from the holder 110. The substrate holder 410 may be a mover which is a portion that moves together with the magnet 320 when a current is applied to the coil 310. In addition, the substrate holder 410 may be a sensor PCB holder. The substrate holder 410 may be shifted in the x-axis direction. The substrate holder 410 may be shifted in the y-axis direction. The substrate holder 410 may be rotated around the z-axis (optical axis). Accordingly, the substrate holder 410 may be a moving part of the second actuator.

The substrate holder 410 may include the third open region 411. The third open region 411 may be a hollow hole. The third open region 411 may be an opening. Preferably, the third open region 411 may be aligned on the fourth open region 121 of the second substrate 120, the image sensor 444, the first open region 433 of the third substrate 430, the second open region 424 of the reinforcing member 420, and the optical axis (OA).

The substrate holder 410 may include a magnet accommodating groove 412. The groove 412 may be formed on an upper surface of the substrate holder 410. The magnet accommodating groove 412 may accommodate at least a part of the magnet 320.

The magnet 320 may be disposed in the magnet accommodating groove 412 of the substrate holder 410. The magnet accommodating groove 412 may be formed in a shape corresponding to the magnet 320. However, a depth of the magnet accommodating groove 412 may be smaller than a thickness of the magnet 320 in a corresponding direction. In this case, a part of the magnet 320 disposed in the magnet accommodating groove 412 may protrude from the substrate holder 410. The magnet accommodating groove 412 may include a plurality of grooves. The magnet accommodating groove 412 may be formed in a number corresponding to a number of the magnets 320. The magnet accommodating groove 412 may include four grooves. However, the magnet accommodating groove 412 of the substrate holder 410 may be replaced with a coil accommodating groove, and thus a coil may be disposed instead of the magnet. In this case, the magnet may be disposed on the driving substrate facing the coil placed in the substrate holder 410.

The substrate holder 410 may include a second insertion hole 413 through which a wire passes. The second insertion hole 413 may be formed passing through the substrate holder 410 in a direction parallel to the optical axis. The wire 510 may be inserted into the second insertion hole 413. The wire 510 may pass through the second insertion hole 413. The second insertion hole 413 may include a plurality of holes. The second insertion hole 413 may be formed in a number corresponding to a number of wires 510. The second insertion hole 413 may include 20 holes. That is, the wire 510 in the embodiment may be composed of 20 wires. Accordingly, the second insertion hole 413 may include 20 holes to allow the 20 wires 510 to pass through. In this case, the number of the wire 510 or the second insertion hole 413 may be smaller than the number of terminals of the image sensor 444 described later. For example, the image sensor 444 may include 36 terminals. And, the wire 510 may include 20 wires less than the number of terminals of the image sensor 444. Accordingly, some of the terminals of the image sensor 444 may not be electrically connected to the wire 510.

The second insertion hole 413 of the substrate holder 410 may be aligned with the third insertion hole 123 of the second substrate 120 in a vertical direction. That is, the wire 510 may pass through the third insertion hole 123 of the second substrate 120 and the second insertion hole 413 of the substrate holder 410 in common. The number of the third insertion holes 123 may be the same as the number of the wires 510 and the second insertion holes 413.

The substrate holder 410 may include a first protrusion 414. The first protrusion 414 may be formed on a lower surface of the substrate holder 410. The first protrusion 414 may be inserted into a first hole 421 of the reinforcing member 420 and a hole 431-1 of the third substrate 430. The first protrusion 414 may be formed in a shape corresponding to the first hole 421 of the reinforcing member 420 and the hole 431-1 of the third substrate 430. The first protrusion 414 may include a plurality of protrusions. The first protrusion 414 may include four protrusions. The four protrusions may be formed at four corners of the substrate holder 410, respectively.

The substrate holder 410 may include a second protrusion 415. The second protrusion 415 may be formed on the lower surface of the substrate holder 410. The second protrusion 415 may be spaced apart from the first protrusion 414. The second protrusion 415 may extend from a side surface of the substrate holder 410. A lower surface of the second protrusion 415 may be disposed lower than a lower surface of the reinforcing plate 445 of the image sensor module 440. The second protrusion 415 may include a plurality of protrusions. The second protrusion 415 may include four protrusions. The four protrusions may be formed at four corners of the substrate holder 410, respectively.

The substrate holder 410 may include a guide protrusion 416. The guide protrusion 416 may be formed on the lower surface of the substrate holder 410. The guide protrusion 416 may guide an assembly position of the image sensor module 440. The guide protrusion 416 may contact a cover 441 of the image sensor module 440. The guide protrusion 416 may contact four side surfaces of the cover 441 of the image sensor module 440.

The substrate holder 410 may include a plurality of side surfaces. The substrate holder 410 may include four side surfaces. The substrate holder 410 may include first to fourth side surfaces. The substrate holder 410 may include the first side surface and the second side surface disposed opposite to each other, and the third side surface and the fourth side surface disposed opposite to each other between the first side surface and the second side surface.

The substrate holder 410 may include a corner formed between the plurality of side surfaces. The substrate holder 410 may include a plurality of corners. The substrate holder 410 may include four corners. The substrate holder 410 may include first to fourth corners. The first corner of the substrate holder 410 may be disposed between the first side surface and the third side surface. The second corner of the substrate holder 410 may be disposed between the third side surface and the second side surface. The third corner of the substrate holder 410 may be disposed between the second side surface and the fourth side surface. The fourth corner of the substrate holder 410 may be disposed between the fourth side surface and the first side surface. That is, the substrate holder 410 may include the four side surfaces and the four corners disposed between the four side surfaces. The second insertion hole 413 through which the wire 510 passes may be formed in the four side surfaces, and the groove 412 into which the magnet is inserted may be formed in the four corners.

The camera device 100A may include the reinforcing member 420. The reinforcing member 420 may be formed of stainless steel (SUS). The reinforcing member 420 may reinforce the third substrate 430. The reinforcing member 420 may be coupled to the third substrate 430. The reinforcing member 420 may be adhered to the third substrate 430 by an adhesive. The reinforcing member 420 may be disposed on the lower surface of the substrate holder 410.

The reinforcing member 420 may include the first coupling hole 421. The first coupling hole 421 may be coupled to the first protrusion 414 of the substrate holder 410. The reinforcing member 420 may include a second coupling hole 422. An adhesive may be applied to the second coupling hole 422. The second coupling hole 422 may be formed in a protruding portion of the reinforcing member 420. The second coupling hole 422 may include a plurality of holes. The second coupling holes 422 may be formed in a total of 16, two for each of eight protruding portions, two for each of four corners of the reinforcing member 420.

The reinforcing member 420 may include a protruding part 423. The protruding part 423 may be formed protruding inward from a corner of the reinforcing member 420. A space in which the first coupling hole 421 is to be formed may be secured in the reinforcing member 420 by the protruding part 423. The first coupling hole 421 may be formed in the protruding part 423.

The reinforcing member 420 may include the second open region 424. The second open region 424 may be aligned on the optical axis OA with the fourth open region 121 of the second substrate 120, the image sensor 444, the first open region 433 of the third substrate 430, and the third open region 411 of the substrate holder 410.

The camera device 100A may include the third substrate 430. The third substrate 430 may be disposed on the lower surface of the substrate holder 410. The third substrate 430 may be coupled to the reinforcing member 420. The third substrate 430 may be coupled to the image sensor module 440. The third substrate 430 may be an image sensor mounting substrate on which an image sensor is mounted. The third substrate 430 may be provided in a state of being suspended below the second substrate 120 by relying on a wire, and may be moved with respect to the second substrate 120 by the coil and the magnet.

That is, the substrate holder 410, the third substrate 430, and the image sensor module 440 are disposed below the second substrate 120.

Here, a structure in which the second substrate 120, the substrate holder 410, the third substrate 430, and the image sensor module 440 are coupled may be referred to as a second actuator or a sensor driving device. In addition, among them, the second substrate 120 and the substrate holder 410 may be fixed parts. In addition, the third substrate 430 may be a moving part.

In this case, the second substrate 120 and the third substrate 430 are electrically connected to each other by the wire 510. Here, a length of the wire 510 is greater than a sum of a thickness of the second substrate 120, a thickness of the substrate holder 410, a thickness of the reinforcing member 420, and a thickness of the third substrate 430. Accordingly, the substrate holder 410 disposed below the second substrate 120 is placed at a position spaced apart from the second substrate 120 by a predetermined distance. In addition, the substrate holder 410, the third substrate 430, and the image sensor module 440 may be fixed by the wire 510 at a position spaced apart from the second substrate 120 by a predetermined distance. That is, the substrate holder 410, the third substrate 430, and the image sensor module 440 are supported by the wire 510, and may be disposed in a structure flying below the second substrate 120.

The third substrate 430 may include an insulating layer 431. The insulating layer 431 may be coupled to the lower surface of the substrate holder 410. The insulating layer 431 may be coupled to the reinforcing member 420. The insulating layer 431 may be coupled to the image sensor module 440. The insulating layer 431 may include a coupling hole 431-1. The coupling hole 431-1 may be coupled to the first protrusion 414 of the substrate holder 410. The insulating layer 431 may include a protruding part 431-2. The protruding part 431-2 may be formed protruding inward from a corner of the insulating layer 431. A space in which the coupling hole 431-1 is formed may be secured by the protruding part 431-2. The coupling hole 431-1 may be formed in the protruding part 431-2.

In addition, the insulating layer 431 may include a first open region 433.

Preferably, the first open region 433 may be aligned on the optical axis OA with a fourth open region 121 of the second substrate 120, the image sensor 444 disposed below, the second open region 424 of the reinforcing member 420, and the third open region 411 of the substrate holder 410.

The third substrate 430 may include the insulating layer 431 and a first lead pattern part 432 disposed on the insulating layer 431.

The first lead pattern part 432 may be electrically connected to a terminal of the image sensor 444. The first lead pattern part 432 may be configured in plural. For example, the first lead pattern part 432 may include a total of 20 terminal portions. That is, the number of terminals of the first lead pattern part 432 may correspond to the number of the wire 510.

In this case, the first lead pattern part 432 may include a first-first lead pattern part 432a disposed in a first region of the insulating layer 431 and a first-two lead pattern part 432b disposed in a second region facing the first region of the insulating layer 43, a first-third lead pattern part 432c disposed in a third region between the first and second region of the insulating layer 431, and a first-fourth lead pattern part 432d may be disposed in a fourth region facing the third region of the insulating layer 431.

In addition, each of the first-first to first-fourth lead pattern parts 432a, 432b, 432c, and 432d may include a first pattern part 432-1 disposed on the insulating layer 431, a second pattern part 432-2 coupled to the wire 510, and a connection part 432-3 connecting the first pattern part 432-1 and the second pattern part 432-2. A hole through which the wire 510 passes may be formed in the second pattern part 432-2. The second pattern part 432-2 may be coupled to the wire 510 by soldering. The connection part 432-3 may include a bent portion. The connection part 432-3 may be bent a plurality of times in one direction. The connection part 432-3 may have elasticity. The first lead pattern part 432 may have elasticity.

The first pattern part 432-1 may be electrically connected to the image sensor module. That is, the first pattern part 432 may be a mounting pad for mounting the image sensor 444 or the image sensor module.

The second pattern part 432-2 may be a bonding pad electrically connected to the wire 510. That is, the second pattern part 432-2 may be a soldering pad soldered to the wire 510. To this end, the second pattern part 432-2 may include a first insertion hole through which the wire 510 passes. The first insertion hole may be aligned in a vertical direction with a second insertion hole formed in the substrate holder and a third insertion hole formed in the driving substrate.

The connection part 432-3 may connect the first pattern part 432-1 and the second pattern part 432-2 with each other. To this end, the connection part 432-3 may include a plurality of bent portions. In this case, the connection parts 432-3 of each of the first lead pattern parts 432a, 432b, 432c, and 432d may be bent in the same direction. For example, as shown in FIG. 11B, the connection parts 432-3 of each of the first lead pattern parts 432a, 432b, 432c, and 432d may include bent portions that rotate clockwise. That is, the connection part 432-3 may be bent in a direction corresponding to a rotation direction in the z-axis direction of the image sensor module. Accordingly, the connection part 432-3 may minimize damage to the first lead pattern part 432 when rotating in the z-axis direction, and accordingly, it is possible to prevent cracks generated in the first lead pattern part 432 or detachment from the insulating layer. Meanwhile, in an embodiment, an adhesive member (not shown) may be disposed between the insulating layer 431 and the first lead pattern part 432. The adhesive member may be interposed between the insulating layer 431 and the first lead pattern part 432 to prevent the first lead pattern part 432 from being detached on the insulating layer 431. The adhesive member may include a curing adhesive or the like.

Meanwhile, the first lead pattern part 432 is a wiring for transmitting an electrical signal, and may be formed of a metal material having high electrical conductivity. To this end, the conductive pattern part 640 may be formed of at least one metal material selected from among gold (Au), silver (Ag), platinum (Pt), titanium (Ti), tin (Sn), copper (Cu), and zinc (Zn). In addition, the first lead pattern part 432 may be formed of paste or solder paste including at least one metal material selected from among gold (Au), silver (Ag), platinum (Pt), titanium (Ti), tin (Sn), copper (Cu), and zinc (Zn), which are excellent in bonding strength.

Preferably, the first lead pattern part 432 may serve as a wiring for transmitting an electrical signal, and may be formed of a metal material having an elastic force capable of moving the third substrate 430 in the X-axis, Y-axis, and Z-axis directions with respect to the second substrate 120. To this end, the first lead pattern part 432 may be formed of a metal material having a tensile strength of 1000 MPa or more. For example, the first lead pattern part 432 may be a binary alloy or ternary alloy containing copper. For example, the first lead pattern part 432 may be a binary alloy of copper (Cu)-nickel (Ni). For example, the first lead pattern part 432 may be a binary alloy of copper (Cu)-tin (Sn). For example, the first lead pattern part 432 may be a binary alloy of copper (Cu)-beryllium (Be). For example, the first lead pattern part 432 may be a binary alloy of copper (Cu)-cobalt (Co). For example, the first lead pattern part 432 may be a ternary alloy of copper (Cu)-nickel (Ni)-tin (Sn). For example, the first lead pattern part 432 may be a ternary alloy of copper (Cu)-beryllium (Be)-cobalt (Co). In addition, in addition to the metal material, the first lead pattern part 432 may be formed of an alloy of iron (Fe), nickel (Ni), zinc, and the like having an elastic force capable of acting as a spring and having good electrical characteristics. Further, the first lead pattern part 432 may be surface-treated with a plating layer containing a metal material such as gold (Au), silver (Ag), palladium (Pd), and the like, thereby improving electrical conductivity.

Meanwhile, the first lead pattern part 432 may be formed by a general process of manufacturing a printed circuit board, such as an additive process, a subtractive process, a modified semi additive process (MSAP), a semi additive process (SAP), etc.

The third substrate 430 will be described in more detail with reference to FIGS. 11B and 11C.

As shown in FIG. 11B, first lead pattern parts 432a, 432b, 432c, and 432d are disposed in each region of the insulating layer 431.

In this case, disposition positions of the first lead pattern parts 432a, 432b, 432c, and 432d are aligned on the same vertical extension line or horizontal extension line.

For example, the first-first lead pattern part 432a and the first-second lead pattern part 432b may be disposed on the first and second regions of the insulating layer 431 facing each other, respectively. Disposition positions of the first-first lead pattern part 432*a* and the first-second lead pattern part 432*b* are aligned on the same horizontal extension line. For example, the first-first lead pattern part 432*a* and the first-second lead pattern part 432*b* may have a structure symmetrical to each other.

In addition, the first-third lead pattern part 432*c* and the first-fourth lead pattern part 432*d* may be disposed on the third and fourth regions of the insulating layer 431 facing each other. Disposition positions of the first-third lead pattern part 432*c* and the first-fourth lead pattern part 432*d* are aligned on the same vertical extension line. For example, the first-third lead pattern part 432*c* and the first-fourth lead pattern part 432*d* may have a structure symmetrical to each other.

Meanwhile, the first pattern part 432-1 may include a mounting part 432-11 on which the image sensor 444 or the image sensor module 440 is mounted, and an extension part 432-12 extending from the mounting part 432-11. In this case, the mounting part 432-11 may have a square pad shape in a plane so that the image sensor 444 or the image sensor module 440 is stably mounted. The extension part 432-12 may extend from the mounting part 432-11 and be connected to the connection part 432-3.

In this case, the extension part 432-12 may be bent from the mounting part 432-11. Accordingly, a center line of the extension part 432-12 may be spaced apart from a center line of the mounting part 432-11 by a third distance d3.

In addition, the extension part 432-12 may include a buffer pattern part for serving as a buffer in a region A connected to the connection part 432-3. The buffer pattern part may have a shape of which a width gradually decreases toward the direction in which the connection part 432-3 is disposed. That is, the extension part 432-12 may include a bent part that is bent and extends from the mounting part 432-11, and a buffer part that is a region extending from the bent part and gradually decreasing in width as a distance from the bent part increases. The buffer part may solve a problem such as a pattern breakage caused by a difference in pattern width between the first pattern part 432-1 and the connection part 432-3, and may stably connect the connection part 432-3 and the mounting part 432-11.

In addition, the buffer part may not be overlapped with the insulating layer in a vertical direction. Accordingly, when the substrate is not only moved in the X-axis, Y-axis, and Z-axis but also tilted, a point in which the connection part and the pattern part are connected does not exist on the insulating layer, but is formed outside the insulating layer, and thus a pattern breakage due to a difference in width between the connection part and the pattern part may be effectively reduced.

Meanwhile, a center of the second pattern part 432-2 and a center of the first pattern part 432-1 may be disposed on the same vertical extension line or horizontal extension line. That is, the center of the second pattern part 432-2 and the center of the first pattern part 432-1 may be aligned on the same vertical line or the horizontal line. To this end, the first pattern part 432-1 may include the extension part 432-12 that is bent from the mounting part 432-11. Accordingly, the wires 510 connected to the second pattern part 432-2 and the terminal of the image sensor 444 disposed on the first pattern part 432-1 may be aligned on the same vertical line or horizontal line, and accordingly, accuracy of a movement position of the image sensor 444 may be improved.

Meanwhile, the first pattern part 432-1 of the first lead pattern part 432 is disposed on the insulating layer 431, and the second pattern part 432-2 and the connection part 432-3 are flying lead pattern parts extending in the horizontal direction from the insulating layer 431. That is, the first pattern part 432-1 is disposed at a position overlapped with the insulating layer 431 in the vertical direction. In addition, the second pattern part 432-2 and the connection part 432-3 are disposed at positions not overlapped with the insulating layer 431 in the vertical direction. That is, the insulating layer 431 may be disposed under the first pattern part 432-1, and the insulating layer 431 may not be disposed under the second pattern part 432-2 and the connection part 432-3. Meanwhile, the camera device 100A may include the image sensor module 440. The image sensor module 440 may be coupled to the substrate holder 410. The image sensor module 440 may be fixed to the substrate holder 410. The image sensor module 440 may move integrally with the substrate holder 410. The image sensor module 440 may include the cover 441, a filter 442, a fourth substrate 443, the image sensor 444, and the reinforcing plate 445. However, any one or more of the cover 441, the filter 442, the fourth substrate 443, the image sensor 444, and the reinforcing plate 445 of the image sensor module 440 may be omitted.

The image sensor module 440 may include the cover 441. The cover 441 may cover the filter 442 and the image sensor 444. The cover 441 may include an upper plate part and a side wall part. The cover 441 may include a hole 441*a*. The hole 441*a* may be a hollow hole. The hole 441*a* may be an opening. The cover 441 may include a protrusion 441*b*. The protrusion 441*b* may protrude from a lower surface of the cover 441. The protrusion 441*b* may be inserted into a second hole 443*b* of the substrate 4430 and a hole 445*a* of the reinforcing plate 445.

The image sensor module 440 may include the filter 442. The filter 442 may serve to block light having a specific frequency band of light passing through the lens module 210 from being incident on the image sensor 444. The filter 442 may be disposed to be parallel to an x-y plane. The filter 442 may be disposed between the lens module 210 and the image sensor 444. The filter 442 may be disposed between the cover 441 and the fourth substrate 443. As a modified example, the filter 442 may be disposed in the hole 441*a* of the cover 441. The filter 442 may include an infrared filter. The infrared filter may absorb or reflect infrared light incident on the infrared filter.

The image sensor module 440 may include the fourth substrate 443. The fourth substrate 443 may be a substrate for mounting the image sensor 444 in a package form. The fourth substrate 443 may include a printed circuit board (PCB). The fourth substrate 443 may include a circuit board. The image sensor 444 may be disposed on the fourth substrate 443. The fourth substrate 443 may be coupled to the third substrate 430. The fourth substrate 443 may include a first hole 443*a* having a shape and a size corresponding to the image sensor 444. The image sensor 444 may be inserted into the first hole 443*a* of the fourth substrate 443. The fourth substrate 443 may include the second hole 443*b*. The protrusion 441*b* of the cover 441 may be inserted into the second hole 443*b* of the fourth substrate 443. The fourth substrate 443 may include a terminal 443*c*. The terminal 443*c* of the fourth substrate 443 may be disposed at each of four side ends of the fourth substrate 443. The terminal 443*c* of the fourth substrate 443 may be connected to the first lead pattern part 432 of the third substrate 430. More specifically, the terminal 443*c* of the fourth substrate 443 may be connected to the first pattern part 432-1 of the first lead pattern part 432 of the third substrate 430.

The fourth substrate 443 may include a groove 443*d*. The groove 443*d* of the fourth substrate 443 may be formed at each of four corners of the fourth substrate 443. The first protrusion 414 of the substrate holder 410 may be avoided by the groove 443*d* of the fourth substrate 443.

The image sensor module 440 may include the image sensor 444. The image sensor 444 may be coupled to the substrate holder 410. The image sensor 444 may move integrally with the substrate holder 410. However, the fourth substrate 443 to which the image sensor 444 is coupled may be coupled to the substrate holder 410 without the image sensor 444 being directly coupled to the substrate holder 410. As a modified example, the image sensor 444 may be directly coupled to the substrate holder 410. The image sensor 444 may be disposed to be aligned with the optical module. The image sensor 444 may be a configuration in which light passing through the lens and the filter 442 is incident to form an image. The image sensor 444 may be mounted on the fourth substrate 443. The image sensor 444 may be electrically connected to the fourth substrate 443. As an example, the image sensor 444 may be coupled to the fourth substrate 443 by surface mounting technology (SMT). As another example, the image sensor 444 may be coupled to the fourth substrate 443 by flip chip technology. The image sensor 444 may be disposed such that the optical axis coincides with the lens. That is, the optical axis of the image sensor 444 and the optical axis of the lens may be aligned. The image sensor 444 may convert light irradiated to an effective image region of the image sensor 444 into an electrical signal. The image sensor 444 may be any one of a charge coupled device (CCD), a metal oxide semi-conductor (MOS), a CPD, and a CID.

In the present embodiment, the image sensor 1440 may be rotated around the x-axis, the y-axis, and the z-axis. The image sensor 1440 may move around the x-axis, the y-axis, and the z-axis. The image sensor 1440 may be tilted around the x-axis, the y-axis, and the z-axis.

The image sensor module 440 may include the reinforcing plate 445. The reinforcing plate 445 may be disposed on the lower surface of the image sensor 444 and the fourth substrate 443. The reinforcing plate 445 may be formed of stainless steel (SUS). The reinforcing plate 445 may reinforce the image sensor 444 and the fourth substrate 443. The reinforcing plate 445 may include the hole 445*a*. The hole 445*a* may be coupled to the protrusion 441*b* of the cover 441. The reinforcing plate 445 may include a groove 445*b*. The groove 445*b* may be formed at each of four corners of the reinforcing plate 445. The groove 445*b* may be formed such that a corner of the reinforcing plate 445 is recessed inward.

The camera device 100A may include the wire 510. The wire 510 may connect the second substrate 120 and the third substrate 430. The wire 510 may have elasticity. The wire 510 may be an elastic member. The wire 510 may be a wire spring. In this case, in a state in which the second substrate 120 and the third substrate 430 are spaced apart from each other by a predetermined distance, the wire 510 may electrically connect the second lead pattern part 122 of the second substrate 120 and the first lead pattern part 432 of the third substrate 430.

The wire 510 may be formed of metal. The wire 510 may be electrically connected to the image sensor 444. The wire 510 may be used as a conductive line of the image sensor 444. One end of the wire 510 may be coupled to the second substrate 120, and the other end of the wire 510 may be coupled to the first lead pattern part 432. The wire 510 may elastically support movement of the substrate holder 410.

The wire 510 may include a plurality of wires. The plurality of wires may include a number of wires corresponding to a number of terminals of the image sensor 444. The plurality of wires may include a total of 20 wires, six for each between adjacent corners of four corners of the substrate holder.

The camera device 100A may include a sensor 520. The sensor 520 may be disposed on an upper surface of the second substrate 120. The sensor 520 may include a hall sensor (Hall IC). The sensor 520 may sense the magnetic force of the magnet 320. Movement of the image sensor 444 may be grasped in real time via the magnetic force of the magnet 320 sensed by the sensor 520. Through this, OIS feedback control may be possible.

The sensor 520 may include a plurality of sensors. The sensor 520 may include three sensors. Through the three sensors, an x-axis movement, a y-axis movement, and a z-axis-centered rotation of the image sensor 444 may be sensed. The sensor 520 may include first to third sensors. The first sensor may face the first magnet 321, the second sensor may face the second magnet 322, and the third sensor may face the third magnet 323.

The camera device 100A may include the housing 600. The housing 600 may be coupled to the holder 110. The housing 600 may provide a space therein by coupling with the holder 110. The appearance of the camera device 100A may be formed by the housing 600 and the holder 110. The housing 600 may accommodate a configuration such as the coil 310, the magnet 320, and the like. The housing 600 may include a shield can.

The housing 600 may include a sidewall 610. The sidewall 610 may include a plurality of sidewalls. The sidewall 610 may include four sidewalls. The housing 600 may include a lower portion 620. The lower portion 620 may extend inward from a lower end of the sidewall 610. The lower portion 620 may include a hole. A lower surface of the housing 600 may be formed by a separate lower plate 630. The lower plate 630 may be understood as one configuration or a separate configuration of the housing 600. The lower plate 630 may include a groove 631 coupled to a protrusion 622 protruding from a lower surface of the lower portion 620 of the housing 600.

The camera device 100A may include the first substrate 150. The first substrate 150 may be electrically connected to the coil 310. The first substrate 150 may include the terminal 150*a* coupled to the terminal 222 of the first actuator 220. The first substrate 150 may include a hole through which the lens module 210 passes.

The camera device 100A may include a connector 190. The connector 190 may be electrically connected to the first substrate 150. The connector 190 may include a port for electrically connecting with an external device.

The camera device 100A may include a motion sensor. The motion sensor may be mounted on the first substrate 150. The motion sensor may be electrically connected to a controller through a circuit pattern provided on the first substrate 150. The motion sensor may output information of a rotational angular velocity due to the movement of the camera device 100A. The motion sensor may include at least one of a two-axis gyro sensor, a three-axis gyro sensor, and an angular velocity sensor.

The camera device 100A may include the controller. The controller may be disposed on the first substrate 150. The controller may be electrically connected to the coil 310. The controller may individually control a direction, intensity, and amplitude of a current supplied to the first to fourth coils 311, 312, 313, and 314. The controller may control a current applied to the coil 310 and a current applied to the first actuator 220 to perform the auto focus function and/or the camera shake correction function. Further, the controller may perform auto focus feedback control and/or camera shake correction feedback control.

The camera device 100A according to the present embodiment may be for mobile camera application. That is, it may be distinguished from a camera device for digital camera application. When down-sizing for mobile camera application, a driving force of VCM is relatively lowered, and thus there is a problem that a current consumed in order to implement three operations (X-Shift, Y-Shift, Z-Rotation (Roll)) is increased.

The magnet 320 and the coil 310 are rotated 90 degrees at each corner of the substrate holder 410, so that the magnet 320 and the coil 310 positioned at diagonal angles may be assembled in the same direction. In this case, a Lorentz force in the same direction may be generated when the image sensor 444 is shift driven, and two pairs of torque may be generated by a force in an opposite direction during a z-axis rotational drive.

In the present embodiment, since four coils located at the corners require current inputs that are independent of each other, it is possible to have a system in which a power terminal of the coil 310 is separated to control by four channels. That is, the present embodiment may include a magnet diagonal arrangement structure in the same magnetic flux direction and an individual current input structure of four coils.

The present embodiment may include two pairs of torque generating structures (increasing in rotation moment). It is possible to generate rotation moment higher than the conventional one by the structures that generate the two pairs of torque, and to reduce total current consumption when driving three modes of X-Shift, Y-Shift, and Z-Rotation (Roll).

Simulation results of the camera device according to the present embodiment are as follows. When "rotation moment=rotational torque*distance between torques=(electromagnetic force*input current)*distance between centers of magnets 320", and 50 mA as an input current is applied to the coil 310 of the camera device 100A according to the present embodiment, it was confirmed that a rotational moment of $\{(0.094 \text{ mN/mA} \times 50 \text{ mA}) \times 12.14 \text{ mm}\} \times 2 = 114.1$ mN·mm was generated.

In the present embodiment, a camera shake correction for the lens corresponding to a camera shake correction for the image sensor 444 may be performed together. For example, when the camera shake correction is performed only by the first actuator 220, positive distortion may occur at an edge of an image obtained by the image sensor 444. Meanwhile, when the camera shake correction is performed by moving only the image sensor 444, negative distortion may occur at the edge of the image obtained by the image sensor 444. In the present embodiment, the camera shake correction of the image sensor 444 and the camera shake correction of the first actuator 220 may be performed together to minimize distortion generated at the edge of the image. In the present embodiment, it is possible to perform the camera shake correction function at the lens side through the first actuator 220, and move so as to correspond to the image sensor 444. Through this, it is possible to provide a camera shake correction of a level corresponding to the module moving method which is a method of integrally moving the lens and the image sensor 444. However, the first actuator 220 according to the present embodiment may provide only the AF function and perform an OIS function by moving the image sensor 444.

Hereinafter, it may include the second substrate 120, the third substrate 430, and the fourth substrate 443 according to an embodiment and a wire 510 electrically connecting them to each other.

Here, the second lead pattern part 122 is formed on the second substrate 120. In addition, the first lead pattern part 432 is formed on the third substrate 430. The image sensor 444 is mounted on the fourth substrate 443. In addition, the second lead pattern part 122 and the first lead pattern part 432 are interconnected through the wire 510.

In addition, the terminal 443c of the fourth substrate 443 is connected to the first lead pattern part 432 of the third substrate 430.

Accordingly, the first lead pattern part 432 of the third substrate 430 and the second lead pattern part 122 of the second substrate 120 are aligned in the optical axis direction. In addition, the first lead pattern part 432 of the third substrate 430 and the terminal 443c of the fourth substrate 443 are arranged in a direction perpendicular to the optical axis direction.

In this case, in the above embodiment, the wire 510 may include 20 wires.

Accordingly, the first lead pattern part 432 of the third substrate 430 may also include 20 lead patterns. In addition, the second lead pattern part 122 of the second substrate 120 may also include 20 lead patterns. Also, the terminals 443c of the fourth substrate 443 may also include 20 terminals.

Accordingly, the terminal 443c of the fourth substrate 443 may be connected 1:1 to one end of the first lead pattern part 432 of the third substrate 430.

In addition, one end of the wire 510 may be connected 1:1 to the other end of the first lead pattern part 432 of the third substrate 430.

In addition, the other end of the wire 510 may be connected 1:1 to the second lead pattern part 122 of the second substrate 120.

Meanwhile, in an embodiment, the image sensor 444 may include a plurality of connection pins. In this case, the number of connection pins of the image sensor 444 may be greater than the number of the wire 510, the first lead pattern part 432, the second lead pattern part 122, and the terminal 443c.

For example, the image sensor 444 may include at least 24 connection pins. For example, the image sensor 444 may include at least 30 connection pins. For example, the image sensor 444 may include at least 36 connection pins.

Table 1 below shows the number of connection pins and their functions of the image sensor 444 of one specification.

TABLE 1

| NO | Symbol | function |
|----|--------|----------|
| 1 | VDDH | First analog power supply pin (2.8 V) |
| 2 | VDDM | Second analog power supply pin (1.8 V) |
| 3 | VSSL | Digital ground (for power) |
| 4 | VDDL | First digital power supply pin (1.05 V) |
| 5 | GND | Digital ground (for MIPI line) |
| 6 | D3P | Third-first image signal output pin |
| 7 | D3N | Third-second image signal output pin |
| 8 | GND | Digital ground (for MIPI line) |
| 9 | GND | Digital ground (for MIPI line) |
| 10 | D1P | First-first image signal output pin |
| 11 | D1N | First-second image signal output pin |
| 12 | GND | Digital ground (for MIPI line) |
| 13 | GND | Digital ground (for MIPI line) |
| 14 | CKP | First-first clock signal output pin |
| 15 | CKN | First-second clock signal output pin |
| 16 | GND | Digital ground (for MIPI line) |
| 17 | GND | Digital ground (for MIPI line) |

TABLE 1-continued

| NO | Symbol | function |
|----|--------|----------|
| 18 | D2P | Second-first image signal output pin |
| 19 | D2N | Second-second image signal output pin |
| 20 | GND | Digital ground (for MIPI line) |
| 21 | GND | Digital ground (for MIPI line) |
| 22 | D4P | Fourth-first image signal output pin |
| 23 | D4N | Fourth-second image signal output pin |
| 24 | GND | Digital ground (for MIPI line) |
| 25 | VSSH | Analog ground (for power) |
| 26 | XCLR | Digital input pin (CHIP CLEAR) |
| 27 | SDA | Digital I/O(I2C pin) |
| 28 | SCL | Digital I/O(I2C pin) |
| 29 | INCK | Digital input pin (CLOCK INPUT) |
| 30 | GPO | MONITOR SIGNAL OUT pin |
| 31 | SLASEL | I2C slave address change pin |
| 32 | TENABLE | TEST ENABLE pin |
| 33 | TESTOUT | MONITOR SIGNAL OUT pin |
| 34 | FSTROBE | Digital output pin (FLASH STROBE) |
| 35 | XVS | Digital I/O(DUAL SYNC) |
| 36 | AGND | Analog ground |

Prior to the description of Table 1, the second lead pattern part 122 of the second substrate 120 may be disposed by five at each of the four side end portions around the central opening region. That is, the second lead pattern part 122 may be disposed by five in each of a first region and a second region facing each other in a first direction with the opening region of the third substrate 430 therebetween, a third region and a fourth region facing each other in a second direction perpendicular to the first direction.

In addition, the first lead pattern part 432 of the third substrate 430 may be disposed by five at each of the four side end portions around the central opening region. That is, the first lead pattern part 432 may be disposed by five in each of a first region and a second region facing each other in a first direction with the opening region of the third substrate 430 therebetween, a third region and a fourth region facing each other in a second direction perpendicular to the first direction.

In addition, the terminal 443c of the fourth substrate 443 may be disposed by five at each of the four side end portions around the central opening region. That is, the terminal 443c may be disposed by five in each of a first region and a second region facing each other in a first direction with the opening region of the third substrate 430 therebetween, a third region and a fourth region facing each other in a second direction perpendicular to the first direction.

In addition, lead pattern parts or terminals disposed at the same position on each substrate may be connected to each other.

For example, a terminal disposed at an uppermost side of the first region among the terminal 443c of the fourth substrate 443 may be connected to a first lead pattern part disposed at an uppermost side of the first region among the first lead pattern part 432 of the third substrate 430. In addition, a first lead pattern part disposed at the uppermost side of the first region among the first lead pattern part 432 of the third substrate 430 may be connected to a second lead pattern part disposed at an uppermost side of the first region of the second substrate 120 among the second lead pattern part 122 of the second substrate 120.

Accordingly, an arrangement of the terminal 443c of the fourth substrate 443 substantially corresponds to an arrangement of the first lead pattern part 432 of the third substrate 430, and they correspond to an arrangement of the second lead pattern part 122 of the second substrate 120.

Hereinafter, the arrangement of the terminal 443c of the fourth substrate 443 will be described. In addition, the arrangement of the second lead pattern part 122 of the second substrate 120 and the arrangement of the first lead pattern part 432 of the third substrate 430 may correspond to the arrangement of the terminal 443c described below.

As shown in Table 1, a total of 36 connection pins exist in a general image sensor.

Therefore, terminals for connection with the 36 connection pins must exist in the fourth substrate 443.

In this case, in the embodiment, the terminal 443c is formed on the fourth substrate 443 to be connected only to twenty connection pins among 36 connection pins of the image sensor 444. In this case, reducing the number of 36 terminals to 20 can be achieved by removing terminals connected to unnecessary connection pins among the connection pins. In this case, if the unnecessary connection pins are simply removed, a problem may occur in noise or signal transmission reliability of a signal transmitted from the image sensor 444.

Therefore, in the embodiment, the effect of the noise in the image signal is minimized through an arrangement design for the 20 terminals, thereby improving reliability.

The digital ground (for the MIPI line) is a total of 10 of the 36 connection pins. This is to minimize the occurrence of the noise in the image signal due to a connection pin such as a power signal during transmission of the image signal, and accordingly, the noise is blocked using the digital ground (for the MIPI line).

However, in the embodiment, 10 digital grounds (for the MIPI line) are integrated into one, and accordingly, the arrangement design of the terminal 443c of the fourth substrate 443 connected to each connection pin allows it to have substantially the same level of the noise impact as the presence of 10 digital grounds (for the MIPI line).

In addition, the power ground is a total of 3 of the 36 connection pins. That is, the power ground includes an analog ground (AGND, VSSH) and a digital ground (VSSL). In addition, the embodiment reduces the power ground to one, and even if only one power ground is used, the effect of the noise caused by a power signal may be minimized according to the arrangement of the terminal 443c.

In addition, the 36 connection pins include pins for adding or verifying additional functions. For example, it includes connection pins for synchronization in a case of using two image sensors at the same time, or connection pins for providing various verifications or functions.

That is, 'SLASEL', 'TENABLE', 'TESTOUT', FSTROBE', 'XVS', etc. exist as connection pins for additional functions or verification among the 36 connection pins. Here, 'SLASEL' is a connection pin for changing the slave address, 'TENABLE' is a pin for test enable, 'TESTOUT' is a pin for image sensor monitoring, 'FSTROBE' is a pin for flash light control, and 'XVS' is a pin for synchronization when using two image sensors. Accordingly, the embodiment may monitor a state of the image sensor using the 'GPO' connection pin, and remove the terminal 443c connected to the five connection pins ('SLASEL', 'TENABLE', 'TESTOUT', FSTROBE', and 'XVS').

Accordingly, in the prior art, 36 terminals were required on the fourth substrate 443 to connect to 36 connection pins of the image sensor. Unlike this, the embodiment removes the terminals connected to nine digital ground connection pins, one analog ground connection pin, and six connection pins for addition/verification among the 36 connection pins, and accordingly, only the terminal 443c connected to the remaining twenty connection pins is formed on the fourth substrate 443.

In this case, depending on the arrangement of the twenty terminals 443c, noise may be included in the image signal, and a reliability problem may occur due to a synchronization error. Therefore, in the embodiment, in order to minimize this problem, the terminals 443c are arranged within a range that does not affect each other.

The number of terminals 443c in the embodiment may be 20. That is, the embodiment may include the terminal 443c, the first lead pattern part 432, and the second lead pattern part 122 electrically connected to twenty connection pins of the connection pins provided in the image sensor 444.

The connection pins of the image sensor 444 may include first to twentieth connection pins electrically connected to the first substrate 150, the second substrate 120, the third substrate 430, and the fourth substrate 443.

The first to twentieth connection pins include a data output pin for transmitting an image signal according to the MIPI (Mobile Industry Processor Interface) protocol, a power supply pin for supplying power, an analog ground pin for grounding the power, a digital ground pin for grounding a data transmission line of the data output pin and a communication pin for communication with a master.

The image sensor 444 may output the image signal through four channels. Accordingly, data output pins of the four channels may be included to transmit the image signal through the four channels among the first to twentieth connection pins of the image sensor 444.

In this case, the image sensor 444 may transfer the image signal through transmission of a differential signal. Accordingly, the data output pins of the four channels each include a positive pin and a negative pin. Accordingly, a total of eight data output pins may be included among the first to twentieth connection pins of the image sensor 444. That is, the eight data output pins are image signal output pins, and may also be referred to as MIPI pins.

In addition, the image sensor 444 may transmit a clock signal for image signals transmitted through the eight data output pins. Accordingly, a clock output pin for image signals may be included among the first to twentieth connection pins of the image sensor 444. In this case, the clock signal of the image signal may also be transmitted using a differential voltage. Accordingly, two clock output pins may be included among the first to twentieth connection pins of the image sensor 444.

In addition, the image sensor 444 may receive power through three power supply lines. Accordingly, three power pins may be included in the first to twentieth connection pins of the image sensor 444 to receive power. For example, the first to twentieth connection pins of the image sensor 444 may include a first analog power supply pin (VDDH in Table 1), a second analog power supply pin (VDDM in Table 1) and a digital power supply pin (VDDL in Table 1). The first analog power supply pin may be a pin for receiving 2.8V power. The second analog power supply pin may be a pin for receiving 1.8V power. In addition, the digital power supply pin may be a pin for receiving power of 1.05V.

In addition, a ground pin may be included among the first to twentieth connection pins of the image sensor 444. The image sensor 444 may include a first ground pin (VSSH in Table 1) for a ground of the analog power. In addition, the image sensor 444 may include a ground for the MIPI line (GND in Table 1).

In addition, a communication pin for communication with the master are included among the first to twentieth connection pins of the image sensor 444. The communication pin may be a pin for signal transmission for operation reliability. For example, the communication pin may include a pin that performs a synchronization sequence for initial operation. For example, the communication pin may include a pin (SDA in Table 1) for transmitting data for initial synchronization and a pin (SCL in Table 1) for transmitting a clock. In addition, the communication pin may include a master clock pin (INCK in Table 1) that transfers a clock from the master to the image sensor 444. In addition, the communication pin may include a reset pin (XCLR in Table 1) for resetting the image sensor 444. In addition, the communication pin may include a monitoring pin (GPO in Table 1) for monitoring the image sensor 444.

As described above, the image sensor 444 includes a plurality of connection pins, of which only twenty connection pins can be connected to the terminal 443c of the fourth substrate 443.

In addition, the twenty connection pins may include eight image signal output pins, two clock output pins for image signals, three power signal input pins, two ground pins, and five communication pins.

The eight image signal output pins include first to fourth image signal output pins. In addition, the first to fourth image signal output pins include a first sub-image signal output pin and a second sub-image signal output pin to transmit a differential signal, respectively.

Accordingly, the first to fourth image signal output pins may include a first-first image signal output pin, a first-second image signal output pin, a second-first image signal output pin, a second-second image signal output pin, a third-first image signal output pin, a third-second image signal output pin, a fourth-first image signal output pin, and a fourth-fourth image signal output pin.

The two clock output pins for the image signals are pins that output clock signals for the image signals output through the eight image signal output pins. In addition, the two clock output pins for the image signal are configured to transmit a differential signal.

In addition, the power signal input pin includes a first analog power input pin, a second analog power input pin, and a digital power input pin.

In addition, the ground pin includes a first ground pin for a ground of a power signal and a second ground pin for a ground of a line for outputting the image signal.

In addition, the communication pin includes a monitoring pin for monitoring a state of the image sensor 444, two synchronization communication pins for initial synchronization, one reset pin for resetting, and a mask clock input pin for clock input of the master.

In this case, in the embodiment, the terminals 443c included on the fourth substrate 443 are connected to the twenty connection pins. Here, the twenty connection pins include a connection pin that is strong against noise and a connection pin that is weak against noise or has a high importance that should not include noise.

Therefore, in the embodiment, the reliability problem caused by reducing the number of ground pins is solved by arranging the terminals 443c connected to the twenty connection pins in consideration of the above matters.

As shown in FIG. 14, an open region is formed in the center of the fourth substrate 443.

One surface of the fourth substrate 443 includes a first region 443-1 and a second region 443-2 disposed facing each other in a first direction with the open region interposed therebetween. In addition, the one surface of the fourth substrate 443 includes a third region 443-3 and a fourth region 443-4 disposed facing each other in a second direction with the open region interposed therebetween.

Five terminals are disposed in the first to fourth regions 443-1, 443-2, 443-3, and 443-4, respectively.

For example, the first to fifth terminals 443-11, 443-12, 443-13, 443-14, and 443-15 are disposed in the first region 443-1 of the fourth substrate 443. For example, the sixth to tenth terminals 443-21, 443-22, 443-23, 443-24, and 443-25 are disposed in the second region 443-2 of the fourth substrate 443. For example, the eleventh to fifteenth terminals 443-31, 443-32, 443-33, 443-34, and 443-35 are disposed in the third region 443-3 of the fourth substrate 443. For example, the sixteenth to twentieth terminals 443-41, 443-42, 443-43, 443-44, and 443-45 are disposed in the fourth region 443-4 of the fourth substrate 443.

Here, the embodiment considers the following for terminal arrangement.

(1) A terminal connected to the image signal output pin is arranged away from a terminal connected to the power signal input pin. This is to prevent noise from being included in the image signal by the power signal.

(2) A terminal connected to the clock signal output pin for an image signal is arranged away from a terminal connected to the power signal input pin. This is to prevent noise from being included in the clock signal by the power signal.

(3) In each connection pin, terminals connected to differential signal pins of the same signal are disposed adjacent to each other. This is because differential signal pins of the same signal must be disposed adjacent to each other to have an effect by differential signal transmission.

(4) A terminal connected to a connection pin having a lowest voltage level and generating no noise is arranged around a terminal connected to a clock signal output pin of an image signal having the highest importance. This is because the clock signal transmitted through the clock signal output pin is the most important in the reliability of the image signal transmission, thereby increasing the reliability of the clock signal.

(5) Terminals connected to the image signal output pin are arranged in regions adjacent to each other, respectively. This is to improve the quality of the image signal by ensuring that the image signal output pins are arranged adjacent to each other and minimizing a length of the transmission path of the image signal.

(6) Terminals connected to the image signal output pins of different channels are spaced apart from each other. This is to minimize mutual interference with each image signal.

Accordingly, the first region 443-1 may include a terminal connected to the image signal output pin. In this case, according to the considerations (2), (3), (5) and (6) among the above considerations, terminals connected to the two channel image signal output pins may be spaced apart from each other in the first region 443-1.

For example, the first terminal 443-11 may be connected to a first-first image signal output pin of the image sensor 444. In addition, the second terminal 443-12 may be connected to a first-second image signal output pin of the image sensor 444. In addition, the fourth terminal 443-14 may be a second-first image signal output pin. In addition, the fifth terminal 443-15 may be a second-second image signal output pin. That is, terminals connected to image signal output pins transmitting differential signals of the same signal are disposed adjacent to each other, and terminals connected to image signal output pins transmitting differential signals of different signals are disposed apart from each other.

Accordingly, the third terminal 443-13 arranged between the second terminal 443-12 and the fourth terminal 443-14 may be connected to a pin other than the image signal output pin and the power signal input pin. In this case, in order to reduce noise of the image signal transmitted through each of the image signal output pins, the third terminal 443-13 may be connected to a monitoring pin. The monitoring pin transmits a signal with a voltage level of about 1.6V, and accordingly, the third terminal 443-13 is connected to the monitoring pin having a lower voltage level than other pins.

A terminal connected to a power signal input pin may be arranged in the second region 443-2. That is, the terminal connected to the power signal input pin should be far from the terminal connected to the image signal output pin or the clock signal output pin, and accordingly, a power signal input pin is disposed in the second region 443-2 spaced apart from the first region 443-1. However, in order to satisfy all of the above considerations, only power signal input pins cannot be arranged in the second region 443-2. Accordingly, some of the communication pins may be disposed in the second region 443-2 along with the power signal input pins.

Accordingly, the sixth to tenth terminals 443-21, 443-22, 443-23, 443-24, and 443-25 may be connected to the power signal input pin and the communication pin.

For example, the sixth terminal 443-21 may be connected to one of synchronization communications. For example, the sixth terminal 443-21 may be connected to a clock communication pin (SCL in Table 1) of an I2C communication line. The seventh terminal 443-22 may be connected to a data communication pin (SDA in Table 1) of an I2C communication line. In addition, the eighth terminal 443-23 may be connected to a reset pin for transmitting a reset signal. In addition, the ninth terminal 443-24 may be connected to a first analog power input pin (eg, VDDH of Table 1 having 2.8V). In addition, the tenth terminal 443-25 may be connected to a second analog power input pin (eg, VDDM of Table 1 having 1.8V).

In this case, the terminals connected to the clock communication pin of the I2C communication line, the data communication pin of the I2C communication line, and the reset pin are arranged in the second region 443-2, which is the same region as the region where the terminal connected to the power input pin is arranged.

This is because the communication speed of the signal transmitted through the clock communication pin of the I2C communication line and the data communication pin of the I2C communication line is as low as 200K to 400K, and thus is resistant to noise. In addition, this is because the signal transmitted through the clock communication pin of the I2C communication line and the data communication pin of the I2C communication line has a voltage level of 1.8V and is higher than other signals.

Terminals connected to the image signal output pin, the clock signal output pins, and the clock signal input pin may be arranged in the third region 443-3.

That is, in consideration of the above considerations, a terminal connected to the image signal output pin is disposed in a region adjacent to the first region 443-1 among the third region 443-3. For example, the eleventh terminal 443-31 may be connected to a third-first image signal output pin. For example, the twelfth terminal 443-32 may be connected to a third-second image signal output pin. In addition, the fourteenth terminal 443-34 may be connected to a first clock signal output pin (CKP in Table 1). In addition, the fifteenth terminal 443-35 may be connected to the second clock signal output pin (CKN in Table 1). In this case, as described in the above considerations, in order to secure transmission reliability of an image signal, reliability of a signal transmitted through the first clock signal output pin and the second clock signal output pin must be secured.

Accordingly, the thirteenth terminal 443-33 is connected to the master clock input pin (INCK in Table 1) having a lowest voltage level among the communication pins. That is, as described above, terminals connected to the clock signal output pin, the master clock input pin, and the monitoring pin may be disposed around the terminals connected to the image signal output pins. In this case, terminals connected to the image signal output pins should be spaced apart from terminals connected to the clock signal output pins. Therefore, a terminal connected to the master clock input pin or a terminal connected to the monitoring pin may be disposed between terminals connected to the image signal output pins. In this case, the monitoring pin transmits a signal with a voltage level of 1.6V, and the master clock input pin transmits a signal with a voltage level of 1.17V. Accordingly, a terminal connected to the master clock input pin having a relatively low voltage level is disposed between a terminal connected to the image signal output pin and a terminal connected to the clock signal output pin. Accordingly, in the embodiment, the quality of the signal transmitted through the clock signal output pin can be improved, and thus reliability can be secured.

Terminals connected to the image signal output pin, the power signal input pin, and the ground pin may be disposed in the fourth region 443-4.

That is, in consideration of the above considerations, terminals connected to the image signal output pins are disposed in a region adjacent to the first region 443-1 among the fourth region 443-4. For example, the sixteenth terminal 443-41 may be connected to the fourth-first image signal output pin. For example, the seventeenth terminal 443-42 may be connected to the fourth-second image signal output pin. In addition, the twentieth terminal 443-45 may be connected to the power signal input pin. For example, the twentieth terminals 443-45 may be connected to the digital power input pin (VDDL in Table 1). In this case, both a terminal connected to an image signal output pin and a terminal connected to a power signal input pin are disposed in the fourth region 443-4. Accordingly, in order to minimize the effect of the noise between them, the embodiment arranges a terminal connected to the ground pin between them. For example, the eighteenth terminal 443-43 may be connected to a second ground pin for a ground of an image signal output line. In addition, the nineteenth terminals 443-44 may be connected to a first ground pin for a ground for a power signal. As described above, in the embodiment, even if the sixteenth terminal 443-41 connected to the image signal output pin and the twentieth terminal 443-45 connected to the power signal input pin are arranged in the same region, the effect of the noise may be minimized by continuously arranging terminals connected to the first ground pin and the second ground pin therebetween.

Meanwhile, in the above, the terminals are individually divided into first to twentieth terminals.

Alternatively, the terminals may be classified by type.

For example, among the terminals, a terminal connected to the image signal output pin of the image sensor 444 may be referred to as first terminals.

Accordingly, the first terminals may be divided into a first-first terminal, a first-second terminal, a first-third terminal, and a first-fourth terminal according to the region in which they are disposed. In addition, each of the first-first terminal, first-second terminal, first-third terminal and first-fourth terminal may be composed of two terminals.

In addition, among the terminals, a terminal connected to the monitoring pin of the image sensor 444 may be referred to as a second terminal.

In addition, among the terminals, a terminal connected to the clock signal output pin of the image sensor may be referred to as a third terminal.

In addition, among the terminals, a terminal connected to the master clock input pin of the image sensor may be referred to as a fourth terminal.

In addition, among the terminals, a terminal connected to the power input pin of the image sensor may be referred to as a fifth terminal.

In addition, among the terminals, a terminal connected to the initial synchronization communication pin of the image sensor may be referred to as a sixth terminal, and a terminal connected to a reset pin of the image sensor may be referred to as a seventh terminal.

In addition, among the terminals, a terminal connected to the ground pin of the image sensor may be referred to as an eighth terminal. Accordingly, the eighth terminal may include one eighth-first terminal for grounding the power input through the fifth-first terminal and one eighth-second terminal for grounding the plurality of first terminals.

FIG. 20 is a view illustrating a connection relationship between a driver IC and a gyro sensor according to an embodiment, and FIG. 21 is a view for describing an operation of a driver IC according to an embodiment.

In the embodiment, a plurality of actuators are included for OIS and AF of the camera device.

And, it includes a plurality of driver ICs to control the operation of the plurality of actuators.

That is, the embodiment includes a first driver IC 270 for controlling the operation of the first actuator 220. In addition, the embodiment includes a second driver IC 914 for controlling the operation of the second actuator.

In this case, the first driver IC 270 and the second driver IC 914 may receive gyro data from the gyro sensor 717 for feedback control.

In addition, the first driver IC 270 may control the first driving part (not shown) based on the received gyro data and position information of the lens module 210 obtained through a first position sensor (eg, sensor magnet or Hall sensor, not shown). In this case, controlling the first driving part (eg, a coil part constituting the first actuator) may correspond to outputting an output signal from the first driver IC 270 to the first driving part. However, the generated output signal may vary according to embodiments. For example, in the first embodiment, the output signal may include an output signal for controlling the strength or direction of current applied to the coil part of the first actuator.

In addition, the second driver IC 914 may control the second driving part based on the received gyro data and position information of the image sensor module obtained through the second position sensor (not shown). In this case, controlling the second driving may correspond to outputting an output signal from the second driver IC 914 to the second driving part. For example, the output signal may include a control signal for controlling the strength or direction of the current applied to the coil part constituting the second driving part of the second actuator.

Meanwhile, in general, when a plurality of driver ICs are included in a camera device, the driver ICs receive gyro data from different gyro sensors. This is because, even if there are a plurality of driver ICs, information required for feedback control is different from each other.

Accordingly, in general, a driver IC performing OIS receives gyro data through a 6-axis gyro sensor, and a driver IC performing AF receives gyro data through a 3-axis gyro sensor.

Unlike this, in the embodiment, the gyro sensor 717 that obtains one 6-axis gyro data is connected to the first driver IC 270 and the second driver IC 914 in common. In addition, the first driver IC 270 and the second driver IC 914 can share gyro data obtained through one gyro sensor 717. For example, the first driver IC 270 and the second driver IC 914 perform feedback control using the same gyro data obtained through one gyro sensor 717.

To this end, the gyro sensor 717 in the embodiment supports a dual interface. That is, the gyro sensor 717 supports a dual interface, and thus can be connected to the first driver IC 270 through a first interface unit and connected to the second driver IC 914 through a second interface unit.

Accordingly, when gyro data is obtained, the gyro sensor 717 may simultaneously transmit the obtained gyro data to the first driver IC 270 and the second actuator through the first and second interface units.

The gyro sensor 717, the first driver IC 270, and the second driver IC 914 may exchange information with each other through SPI communication.

For example, the first and second interface units of the gyro sensor 717 may include a plurality of terminals for SPI communication.

In this case, in an embodiment, a master for proactively controlling the gyro sensor 717 may be set among the first driver IC 270 and the second driver IC 914. The driver IC set as the master may control the gyro sensor 717 and perform a series of control operations until gyro data is obtained from the gyro sensor 717. In this case, as shown in the drawing, the first driver IC 270 may be set as a master. However, the embodiment is not limited thereto, and the second driver IC 914 instead of the first driver IC 270 may be set as a master to control a series of operations of the gyro sensor 717. Hereinafter, a case in which the first driver IC 270 is set as a master will be described.

The first driver IC 270 and the gyro sensor 717 may be interconnected through the first interface unit. The first interface unit may interconnect the first driver IC 270 and the gyro sensor 717 with four wires or conductive lines.

In addition, the second driver IC 914 and the gyro sensor 717 may be interconnected through the second interface unit. For example, the second interface unit may interconnect the second driver IC 914 and the gyro sensor 717 with three wires or conductive lines.

The first interface unit may include pins such as ADO, CS, SCL, and SDA. The ADO may be a bus corresponding to MOSI in SPI communication. That is, ADO may be a bus corresponding to an output from a master or an input to a slave. For example, the ADO may be a bus for providing a control signal from the first driver IC 270 to the gyro sensor 717. In addition, the CS may be a bus corresponding to chip select. The SCL may be a bus for providing a clock signal. The SDA may be a data bus for providing gyro data. As described above, the first interface unit may connect the first driver IC 270 and the gyro sensor 717 through four wires or conductive lines including ADO, CS, SCL, and SDA. However, the first interface unit may additionally include a bus corresponding to INT1. The INT1 may be an option pin for removing noise from a communication line between the first driver IC 270 and the gyro sensor 717.

The second interface unit may include pins such as SDIO, SCLK, and CS. The SDIO may be a data bus for providing gyro data. That is, the gyro data obtained through the gyro sensor 717 may be transmitted to the second driver IC 914 through a bus corresponding to the SDIO. The SCLK may be a bus for providing a clock signal. The CS may be a bus corresponding to chip select. The second interface unit may connect the second driver IC 914 and the gyro sensor 717 through three wires such as SDIO, SCLK, and CS. However, the second interface unit may additionally include a bus corresponding to INT2. The INT2 may be an option pin for removing noise from a communication line between the second driver IC 914 and the gyro sensor 717.

As described above, the gyro sensor 717 supports a dual interface, and accordingly, the gyro sensor may be connected to the driver IC set as the master with 4 wires and connected to other driver ICs with 3 wires to build an SPI communication system.

Meanwhile, the gyro sensor 717 needs to set various registers for dual operation and to receive an enable signal to start the operation.

Accordingly, the first driver IC 270 set as a master may set a register of the gyro sensor 717 through the ADO and provide an activation signal to the gyro sensor 717. The register settings may include settings related to communication and interrupt. For example, the register settings may include settings related to power-on of the gyro sensor 717, settings related to accelerator, and configuration.

Meanwhile, the first driver IC 270 may provide a timing signal to the second driver IC 914. The timing signal may include information about a reading time point of gyro data obtained from the gyro sensor 717. That is, the gyro sensor 717 does not always obtain gyro data for feedback control, but obtains gyro data based on an activation signal provided from the first driver IC 270, for example, an initial setting waiting time. Accordingly, gyro data read by the second driver IC 914 may not always have a normal value. Accordingly, the first driver IC 270 may be connected to the second driver IC 914 through a specific port to provide a timing signal. For example, the first driver IC 270 may output the timing signal through EIRQ for signal monitoring. For example, the second driver IC 914 may receive the output timing signal through a GPIO. For example, an EIRQ pin included in the first driver IC 270 and a GPIO included in the second driver IC 914 may be interconnected to output or receive the timing signal.

Hereinafter, operations of the first driver IC 270, the second driver IC 914, and the gyro sensor 717 will be described.

Firstly, the first driver IC 270 is set as a master of the gyro sensor 717 and, accordingly, may set the register of the gyro sensor 717 and provide an activation signal. The activation signal may be a signal for initial operation of the gyro sensor 717. For example, the activation signal may include a dual operation command of the gyro sensor 717 and may include an initial setting waiting time of the gyro sensor 717. The gyro sensor 717 may start operating according to an activation signal provided from the first driver IC 270. Preferably, the gyro sensor 717 may start an operation after reflecting the initial setting waiting time, and may provide the obtained gyro data to the first driver IC 270 and the second driver IC 914.

The first driver IC 270 may output a control signal based on gyro data provided from the gyro sensor 717 and position information of the lens module 210. In this case, the position information of the lens module 210 may be information obtained through the first position sensor. In addition, the first driver IC 270 may output a control signal for adjusting the position of the lens module based on the gyro data and the position information of the lens module 210.

In addition, the second driver IC 914 may receive gyro data provided from the gyro sensor 717. In this case, the second driver IC 914 may receive a timing signal from the first driver IC 270. In addition, the second driver IC 914 may determine a reading time point of the gyro data based on the received timing signal.

According to this, in the embodiment, the operation of the first actuator 220 and the second actuator may be performed using gyro data obtained at the same position. This can improve operation reliability of AF and OIS according to the embodiment.

For example, the first driver IC 270 of the first actuator 220 and the second driver IC 914 of the second actuator may receive gyro data from different gyro sensors. In this case, gyro sensors that respectively provide gyro data to the first and second driver ICs may be mounted at different positions on the substrate included in the camera device. In this case, as the gyro sensors are mounted at different positions, additional settings for data correction between them must be made. In addition, even if the additional settings are made, the first and second driver ICs may perform AF and OIS based on different gyro data according to errors in data obtained for each gyro sensor. This may act as a factor that reduces the reliability of OIS and AF of the camera device. Unlike this, in the embodiment, the operation of the first driver IC 270 and the second driver IC 914 is performed using one gyro sensor 717. Accordingly, the embodiment can improve operation reliability of OIS and AF by the first driver IC 270 and the second driver IC 914.

In addition, in the embodiment, the first actuator 200 and the second actuator may be operated by gyro data obtained at the same time point. This may achieve synchronization of AF and OIS operations according to an embodiment.

For example, the first driver IC 270 of the first actuator 200 and the second driver IC 914 of the second actuator may receive gyro data from different gyro sensors. In this case, even if the operating timings of the plurality of gyro sensors are set to be the same, an error with respect to the acquisition time of gyro data obtained from each sensor may occur according to an error of each sensor. In addition, this may act as a factor reducing reliability of OIS and AF of the camera device. Unlike this, in the embodiment, the operation of the first driver IC 270 and the second driver IC 914 is performed using one gyro sensor 717, and accordingly, operations of the first driver IC 270 and the second driver IC 914 can be synchronized. Accordingly, the embodiment may remove OIS and AF errors by the first driver IC 270 and the second driver IC 914, and accordingly, operation reliability may be improved.

Hereinafter, an optical device according to the present embodiment will be described with reference to the drawings.

FIG. 22 is a perspective view of an optical device according to the present embodiment, and FIG. 23 is a block diagram of the optical device shown in FIG. 22.

The optical device may be any one of a mobile phone and a portable phone, a smart phone, a portable smart device, a digital camera, a laptop computer, a digital broadcasting terminal, a personal digital assistant (PDA), a portable multimedia player (PMP), and a navigation device. However, types of the optical device are not limited thereto, and any device for capturing an image or a picture may be included in the optical device.

The optical device may include a main body 1250. The main body 1250 may be in the form of a bar. Alternatively, the main body 1250 may have various structures such as a slide type, a folder type, a swing type, a swivel type, and the like in which two or more sub-bodies are coupled to be relatively movable. The main body 1250 may include a case (casing, housing, and cover) forming an external appearance. For example, the main body 1250 may include a front case 1251 and a rear case 1252. Various electronic components of the optical device may be built in a space formed between the front case 1251 and the rear case 1252. A display 1151 may be disposed on one surface of the main body 1250. A camera 1121 may be disposed on any one or more surfaces of one surface of the main body 1250 and the other surface disposed on the opposite side of the one surface.

The optical device may include a wireless communication unit 1110. The wireless communication unit 1110 may include one or more modules that enable wireless communication between the optical device and a wireless communication system or between the optical device and a network in which the optical device is positioned. For example, the wireless communication unit 1110 may include any one or more of a broadcast receiving module 1111, a mobile communication module 1112, a wireless internet module 1113, a short range communication module 1114, and a position information module 1115.

The optical device may include an A/V input unit 1120. The A/V input unit 1120 is for inputting an audio signal or a video signal and may include any one or more of a camera 1121 and a microphone 1122. In this case, the camera 1121 may include a camera device according to the present embodiment described above.

The optical device may include a sensing unit 1140. The sensing unit 1140 may sense a current state of the optical device such as an opening/closing state of the optical device, a position of the optical device, a presence of a user contact, orientation of the optical device, acceleration/deceleration of the optical device, and the like to generate a sensing signal for controlling an operation of the optical device. For example, when the optical device is in the form of a slide phone, whether the slide phone is opened or closed may be sensed. In addition, it may be responsible for sensing functions related to whether a power supply unit 1190 supplies power or whether an interface unit 1170 is coupled to an external device.

The optical device may include an input/output unit 1150. The input/output unit 1150 may be a configuration for generating an input or output related to vision, hearing, or tactile sense. The input/output unit 1150 may generate input data for controlling an operation of the optical device, and may output information processed by the optical device.

The input/output unit 1150 may include at least one of a keypad portion 1130, a display 1151, a sound output module 1152, and a touch screen panel 1153. The keypad portion 1130 may generate input data by using a keypad input. The display 1151 may output an image captured by the camera 1121. The display 1151 may include a plurality of pixels whose color changes according to an electrical signal. For example, the display 1151 may include at least one of a liquid crystal display (LCD), a thin film transistor-liquid crystal display (TFT LCD), an organic light-emitting diode (OLED), a flexible display, and a three-dimensional (3D) display. The sound output module 1152 may output audio data received from the wireless communication unit 1110 in a call signal reception, a call mode, a recording mode, a voice recognition mode, or a broadcast reception mode, or output audio data stored in a memory unit 1160. The touch screen panel 1153 may convert a change in capacitance generated due to a user's touch on a specific region of a touch screen into an electrical input signal.

The optical device may include the memory unit 1160. The memory unit 1160 may store a program for processing and controlling a controller 1180. In addition, the memory unit 1160 may store input/output data, for example, any one or more of a phone book, a message, audio, a still image, a photo, and a video. The memory unit 1160 may store an image captured by the camera 1121, for example, a picture or a video.

The optical device may include the interface unit 1170. The interface unit 1170 serves as a path for connecting with an external device connected to the optical device. The interface unit 1170 may receive data from an external device, receive power to transfer to each element inside the optical device, or transmit data within the optical device to an external device. The interface unit 1170 may include any one or more of a wired/wireless headset port, an external charger port, a wired/wireless data port, a memory card port, a port connecting a device equipped with an identification module, and audio input/output (I/O) port, a video input/output (I/O) port, and an earphone port.

The optical device may include the controller 1180. The controller 1180 may control an overall operation of the optical device. The controller 1180 may perform related control and processing for voice call, data communication, video call, and the like. The controller 1180 may include a multimedia module 1181 for playing multimedia. The multimedia module 1181 may be provided in the controller 1180, or may be provided separately from the controller 1180. The controller 1180 may perform a pattern recognition processing for recognizing a writing input or a drawing input performed on a touch screen as text and an image, respectively.

The optical device may include the power supply unit 1190. The power supply unit 1190 may receive an external power source or an internal power source by a control of the controller 1180 to supply the power necessary for operating each element.

According to the embodiment, in order to realize OIS and AF functions of the camera module, instead of moving the conventional lens barrel, the image sensor is moved relative to the lens barrel in the X-axis, Y-axis, and Z-axis directions. Accordingly, the camera module according to the embodiment may remove a complicated spring structure for realizing the OIS and AF functions, thereby simplifying a structure. In addition, the structure that is more stable than the existing one may be formed by moving the image sensor according to the embodiment relative to the lens barrel.

In addition, according to the embodiment, the terminal portion electrically connected to the image sensor has a spring structure and is disposed to be floated at a position not overlapped with the insulating layer in the vertical direction. Accordingly, the camera module may move the image sensor relative to the lens barrel while supporting the image sensor stably and elastically.

According to the above-described embodiment, a X-axis direction shift, a Y-axis direction shift, and a Z-axis-centered rotation corresponding to camera shake with respect to the image sensor may be performed, and accordingly, the camera shake correction with respect to the lens corresponding to the camera shake correction with respect to the image sensor may be performed together, thereby providing a more enhanced camera shake correction function.

In addition, according to the embodiment, it is possible to reduce a total height of the camera device by embedding electrical elements required for a camera circuit by utilizing an internal space of the second actuator for moving the image sensor relative to the lens barrel.

Further, according to the embodiment, a camera assembly process may be simplified by integrating and fusing components of the camera circuit and components of the second actuator.

In addition, according to the embodiment, AF is performed using a first actuator that implements a lens shift method, and OIS is performed using a second actuator that implements an image sensor shift method, and accordingly, the reliability of the camera device can be improved.

In addition, according to the embodiment, the operation of the first actuator and the second actuator is performed using a gyro sensor supporting a 6-axis (eg, 3-axis accelerometer and 3-axis gyroscope) dual interface. Specifically, the first actuator and the second actuator need to receive gyro data from the gyro sensor in order to implement an auto focus function and a camera shake correction function. In this case, the embodiment allows gyro data obtained from a single gyro sensor supporting a dual interface to be provided to the first and second actuators. In an embodiment, the operation of the first actuator and the second actuator is performed based on gyro data obtained at the same time and position, and accordingly, mutual correction operations of the auto focus function and the camera shake correction function can be synchronized, and the reliability can be improved. In addition, according to the embodiment, the accuracy of the autofocus function and the camera shake correction function may be improved as the first actuator and the second actuator are operated based on gyro data obtained at the same time and position.

Although the embodiments of the present invention have been described with reference to the accompanying drawings, those skilled in the art to which the present invention pertains will be understood that the present invention may be implemented in other specific forms without modifying the technical spirit and essential features of the present invention. Therefore, it should be understood that the embodiments described above are illustrative in all aspects and not restrictive.

The invention claimed is:

1. A camera device comprising:
a sensor substrate having a plurality of terminals; and
an image sensor disposed on the sensor substrate and having a plurality of connection pins connected to the plurality of terminals,
wherein the sensor substrate includes an open region in which the image sensor is disposed,
wherein one surface of the sensor substrate includes:
first and second regions facing each other in a first horizontal direction with the open region therebetween; and
third and fourth regions facing each other in a second horizontal direction different from the first horizontal direction with the open region interposed therebetween,
wherein the connection pins include first-first to second-second image signal output pins for outputting an image signal and a monitoring pin,
wherein the terminals include first to fifth terminals disposed in the first region,
wherein the first terminal is connected to the first-first image signal output pin of the image sensor, wherein the second terminal is connected to the first-second image signal output pin of the image sensor and is disposed adjacent to the first terminal, wherein the third terminal is connected to the monitoring pin of the image sensor, wherein the fourth terminal is connected to the second-first image signal output pin of the image sensor, wherein the fifth terminal is connected to the second-second image signal output pin of the image sensor and is disposed adjacent to the fourth terminal, and wherein the first-first and first-second image signal output pins outputs a differential signal for a same image signal, wherein the second-first and second-second image signal output pins outputs a differential signals for a same image signal, and wherein the third terminal is disposed between the second terminal and the fourth terminal.

2. The camera device of claim 1, further comprising:

a moving part coupled to the sensor substrate and having a first lead pattern part connected to the terminals;

a fixed part disposed on the moving part and having a second lead pattern part corresponding to the first lead pattern part; and a wire part disposed between the first lead pattern part and the second lead pattern part, wherein the wire part has one end connected to the first lead pattern part and the other end connected to the second lead pattern part to elastically support the moving part.

3. The camera device of claim 2, wherein the wire part includes a plurality of wires, wherein a number of the plurality of wires is smaller than the number of the plurality of connection pins, and wherein a number of second lead pattern parts is smaller than the number of the plurality of connection pins.

4. The camera device of claim 2, further comprising:

a lens module disposed on the image sensor;

a first actuator driving the lens module;

a second actuator driving the image sensor; and a gyro sensor including a first interface unit connected to the first actuator and a second interface unit connected to the second actuator, wherein the first actuator and the second actuator are commonly connected to the gyro sensor through the first interface unit and the second interface unit.

5. The camera device of claim 4, wherein the first actuator includes a first driver IC connected to the first interface unit of the gyro sensor, wherein the second actuator includes a second driver IC connected to the second interface unit of the gyro sensor, wherein one of the first driver IC and the second driver IC is set as a master, and wherein the driver IC set as the master provides a timing signal for reading the-gyro data to the other driver IC.

6. The camera device of claim 1, wherein the terminals include sixth to tenth terminals disposed in the second region, eleventh to fifteenth terminals disposed in the third region, and sixteenth to twentieth terminals disposed in the fourth region, and wherein a number of terminals disposed in each of the first to fourth regions is equal to each other.

7. The camera device of claim 6, wherein the eleventh terminal is connected to a third-first image signal output pin of the image sensor and is disposed adjacent to the first terminal in the third region, wherein the twelfth terminal is connected to a third-second image signal output pin and is disposed adjacent to the eleventh terminal, and wherein the third-first and third-second image signal output pins outputs a differential signal for a same image signal.

8. The camera device of claim 7, wherein the sixteenth terminal is connected to a fourth-first image signal output pin of the image sensor and is disposed adjacent to the fifth terminal in the fourth region, wherein the seventeenth terminal is connected to a fourth-second image signal output pin and is disposed adjacent to the sixteenth terminal, and wherein the fourth-first and fourth-second image signal output pins outputs a differential signal for a same image signal.

9. The camera device of claim 7, wherein the plurality of connection pins include a plurality of clock signal output pins, wherein the fourteenth terminal is connected to a first clock signal output pin of the plurality of clock signal output pins, wherein the fifteenth terminal is connected to a second clock signal output pin of the plurality of clock signal output pins, and wherein the fourteenth terminal is disposed spaced apart from the twelfth terminal in the third region with the thirteenth terminal interposed therebetween.

10. The camera device of claim 9, wherein the plurality of connection pins includes a master clock input pin, wherein the thirteenth terminal is connected to the master clock input pin, and wherein a signal voltage level of the thirteenth terminal is lower than a signal voltage level of the third terminal.

11. The camera device of claim 10, wherein the sixth terminal is connected to a clock communication pin of an I2C communication line, wherein the seventh terminal is connected to a data communication pin of the I2C communication line, wherein the eighth terminal is connected to a reset pin for transmitting a reset signal, wherein the ninth terminal is connected to a first analog power input pin, and wherein the tenth terminal is connected to a second analog power input pin.

12. The camera device of claim 11, wherein the twentieth terminal is connected to a digital power input pin and is disposed spaced apart from the seventeenth terminal with a ground terminal interposed therebetween.

13. The camera device of claim 12, wherein the eighteenth terminal is connected to a second ground pin for a ground of an image signal output line, and wherein the nineteenth terminal is connected to a first ground pin for a ground for a power signal.

14. The camera device of claim 5, wherein the timing signal is information about a reading point of the gyro data acquired from the gyro sensor.

15. The camera device of claim 14, wherein the gyro sensor is a gyro sensor that supports a 6-axis dual interface, and wherein the gyro data is 6-axis gyro data acquired from the gyro sensor.

* * * * *